United States Patent
Sha et al.

(10) Patent No.: US 12,499,505 B2
(45) Date of Patent: Dec. 16, 2025

(54) SYSTEMS AND METHODS FOR REAL-TIME MULTIPLE MODALITY IMAGE ALIGNMENT

(71) Applicant: Z Imaging, Boston, MA (US)

(72) Inventors: Raahil Mohammed Sha, Allen, TX (US); Jose Maria Amich Manero, Cambridge, MA (US)

(73) Assignee: Zeta Surgical Inc., Boston, MA (US)

( * ) Notice: Subject to any disclaimer, the term of this patent is extended or adjusted under 35 U.S.C. 154(b) by 311 days.

(21) Appl. No.: 17/635,693

(22) PCT Filed: Aug. 14, 2020

(86) PCT No.: PCT/US2020/046473
§ 371 (c)(1),
(2) Date: Feb. 15, 2022

(87) PCT Pub. No.: WO2021/034701
PCT Pub. Date: Feb. 25, 2021

(65) Prior Publication Data
US 2022/0285009 A1    Sep. 8, 2022

Related U.S. Application Data

(60) Provisional application No. 62/888,099, filed on Aug. 16, 2019.

(51) Int. Cl.
*G06T 3/14* (2024.01)
*G06T 7/11* (2017.01)
(Continued)

(52) U.S. Cl.
CPC ............ *G06T 3/14* (2024.01); *G06T 7/11* (2017.01); *G06T 7/344* (2017.01); *G06T 7/521* (2017.01);
(Continued)

(58) Field of Classification Search
CPC ..... G06T 7/50–596; G06T 2207/10028; G06T 7/30–38; G06T 2207/10072–10112;
(Continued)

(56) References Cited

U.S. PATENT DOCUMENTS 5,531,520 A * 7/1996 Grimson ................ A61B 90/13
382/294
2017/0032527 A1* 2/2017 Murthy ................... G06T 7/344
(Continued)

OTHER PUBLICATIONS

Yousif, Khalid, Alireza Bab-Hadiashar, and Reza Hoseinnezhad. "3d registration in dark environments using rgb-d cameras." 2013 International Conference on Digital Image Computing: Techniques and Applications (DICTA). IEEE, 2013. (Year: 2013).*
(Continued)

*Primary Examiner* — Geoffrey E Summers
(74) *Attorney, Agent, or Firm* — Chang & Hale LLP

(57) ABSTRACT

A method for aligning multiple depth cameras in an environment based on image data can include accessing, by one or more processors, a plurality of first point cloud data points corresponding to a first pose relative to a subject and a plurality of second point cloud data points corresponding to a second pose relative to the subject. The method can include determining, by the one or more processors, a frame of reference for image data based on at least one of the first pose or the second pose. The method can include transforming, by the one or more processors, at least one of the plurality of first point cloud data points or the plurality of second point cloud data points to align with the frame of reference.

20 Claims, 11 Drawing Sheets

(51) Int. Cl.
  *G06T 7/33* (2017.01)
  *G06T 7/521* (2017.01)
  *G06T 7/70* (2017.01)

(52) U.S. Cl.
  CPC ...... *G06T 7/70* (2017.01); *G06T 2207/10028* (2013.01); *G06T 2207/10072* (2013.01); *G06T 2207/10088* (2013.01)

(58) Field of Classification Search
  CPC ............ G06T 7/70–77; G06T 7/80–85; G06T 7/20–292; G06T 3/14–153; G06T 7/11; G06T 7/12; G06T 7/174; G06T 7/194; G06V 10/26; G06V 10/267; G06V 10/273
  See application file for complete search history.

(56) References Cited

U.S. PATENT DOCUMENTS

| | | | | |
|---|---|---|---|---|
| 2017/0091939 | A1* | 3/2017 | Kluckner | G06T 19/00 |
| 2018/0122137 | A1* | 5/2018 | Tian | G06T 17/00 |
| 2019/0116372 | A1* | 4/2019 | Cohen | H04N 19/597 |
| 2020/0043143 | A1* | 2/2020 | Territo | A61B 6/5264 |
| 2020/0394821 | A1* | 12/2020 | Huang | A61B 5/055 |

OTHER PUBLICATIONS

Morell-Gimenez, Vicente, et al. "A comparative study of registration methods for RGB-D video of static scenes." Sensors 14.5 (2014): 8547-8576. (Year: 2014).*

Smisek, Jan, Michal Jancosek, and Tomas Pajdla. "3D with Kinect." 2011 IEEE International Conference on Computer Vision Workshops (ICCV Workshops). IEEE, 2011. (Year: 2011).*

Lin, Shih-Yen, et al. "Automatic Co-registration of MEG-MRI Data Using Multiple RGB-D Cameras." International Conference on Biomedical and Health Informatics: ICBHI 2015, Haikou, China, Oct. 8-10, 2015. Springer Singapore, 2019. (Year: 2018).*

Heß, Mirco, et al. "A dual-Kinect approach to determine torso surface motion for respiratory motion correction in PET." Medical physics 42.5 (2015): 2276-2286. (Year: 2015).*

Chen, Siheng, et al. "Contour-enhanced resampling of 3D point clouds via graphs." 2017 IEEE international conference on acoustics, speech and signal processing (ICASSP). IEEE, 2017. (Year: 2017).*

He, Ying, et al. "An iterative closest points algorithm for registration of 3D laser scanner point clouds with geometric features." Sensors 17.8 (2017): 1862. (Year: 2017).*

* cited by examiner

SYSTEMS AND METHODS FOR REAL-TIME MULTIPLE MODALITY IMAGE ALIGNMENT

CROSS-REFERENCE TO RELATED APPLICATIONS

This application is a national stage application of International Application No. PCT/US2020/046473, filed Aug. 14, 2020, which claims the benefit of and priority to U.S. Provisional Patent Application No. 62/888,099, filed Aug. 16, 2019, the disclosure of which is incorporated herein by reference in its entirety.

BACKGROUND

Image registration can be used in various applications. For example, image data from a camera can be registered to a 3D model to correlate the image data with stored 3D information.

SUMMARY

The present disclosure relates generally to the field of image detection and registration. More particularly, the present disclosure relates to systems and methods for real-time multiple modality image alignment. The systems and methods of this technical solution can be used for real-time 3D point cloud and image registration, such as for medical analysis or surgical applications.

Various aspects relate generally to systems and methods for real-time multiple modality image alignment using three-dimensional (3D) image data, and can be implemented without markers and at sub-millimeter precision. 3D images, including scans such as CTs or MRIs, can be registered directly onto a subject, such as the body of a patient, that is captured in real-time using one or more capture devices. This allows for certain scan information, such as internal tissue information, to be displayed in real-time along with a point-cloud representation of the subject. This can be beneficial for surgical procedures that would otherwise utilize manual processes to orient instruments in the same frame of reference in a CT scan. Instruments can be tracked, instrument trajectories can be drawn, and targets can be highlighted on the scans. The present solution can provide real-time, sub-millimeter registration for various applications such as aligning depth capture information with medical scans (e.g., for surgical navigation), aligning depth capture information with CAD models (e.g., for manufacturing and troubleshooting), aligning and fusing multiple medical image modalities (e.g., MRI and CT; CT and 3D ultrasound; MRI and 3D ultrasound), aligning multiple CAD models (e.g., to find differences between models), and fusing depth capture data from multiple image capture devices).

The present solution can be implemented for image-guided procedures in various settings, including operating rooms, outpatient settings, CT suites, ICUs, and emergency rooms. The present solution can be used for neurosurgery applications such as CSF-diversion procedures, such as external ventricular placements and VP shunt placements; brain tumor resections and biopsies; and electrode placements. The present solution can be used for interventional radiology, such as for abdominal and lung biopsies, ablations, aspirations, and drainages. The present solution can be used for orthopedic surgery, such as for spinal fusion procedures At least one aspect of the present disclosure relates to a method of transforming a three-dimensional point cloud to a different reference frame. The method can be performed, for example, by one or more processors of a data processing system. The method can include accessing, by one or more processors, a first set of data points of a first point cloud captured by a first capture device having a first pose, and a second set of data points of a second point cloud captured by a second capture device having a second pose different from the first pose. The method can include selecting a reference frame based on the first set of data points. The method can include determining a transformation data structure for the second set of data points using the reference frame and the first set of data points. The method can include transforming the second set of data points into a transformed set of data points using the transformation data structure and the second set of data points.

In some implementations of the method, accessing the first set of data points of a first point cloud can include receiving three-dimensional image data from the first capture device. In some implementations of the method, accessing the first set of data points of a first point cloud can include generating the first point cloud to have the first set of data points using the 3D image data from the first capture device.

In some implementations of the method, the second capture device can be the same as the first capture device. In some implementations of the method, selecting the reference frame can include selecting a first frame of reference of the first point cloud as the first frame of reference. In some implementations of the method, selecting the reference frame can include retrieving color data assigned to one or more of the first set of data points of the first point cloud. In some implementations of the method, selecting the reference frame can include determining the reference frame based on the color data. In some implementations of the method, determining the transformation data structure can include generating the transformation data structure to include a change in position or a change in rotation of at least one point in the second set of data points.

In some implementations of the method, transforming the second set of data points can include applying the change in position or the change in rotation to the at least one point in the second set of data points to generate a transformed set of data points. In some implementations of the method, it can include further including generating a combined set of data points including the first set of data points and the transformed set of data points. In some implementations of the method, accessing the first set of data points and the second set of data points can include down-sampling at least one of the first set of data points or the second set of data points. In some implementations of the method, transforming the second set of data points can include matching at least one first point of the first set of data points to at least one second point of the second set of data points.

At least one other aspect of the present disclosure relates to a system configured to transform a three-dimensional point cloud to a different reference frame. The system can include one or more processors configured by machine-readable instructions. The system can access, by one or more processors, a first set of data points of a first point cloud captured by a first capture device having a first pose, and a second set of data points of a second point cloud captured by a second capture device having a second pose different from the first pose. The system can select, by the one or more processors, a reference frame based on the first set of data points. The system can determine, by the one or more processors, a transformation data structure for the second set of data points using the reference frame and the first set of data points. The system can transform, by the one or more processors, the second set of data points into a transformed set of data points using the transformation data structure and the second set of data points.

In some implementations, the system can access the first set of data points of a first point cloud by receiving three-dimensional image data from the first capture device. In some implementations, the system can access the first set of data points of a first point cloud by generating the first point cloud to have the first set of data points using the 3D image data from the first capture device. In some implementations of the system, the second capture device can be the same as the first capture device. In some implementations, the system can select the reference frame by selecting a first frame of reference of the first point cloud as the first frame of reference.

In some implementations, the system can retrieve color data assigned to one or more of the first set of data points of the first point cloud. In some implementations, the system can determine the reference frame based on the color data. In some implementations, the system can determine the transformation data structure by generating the transformation data structure to include a change in position or a change in rotation of at least one point in the second set of data points. In some implementations, the system can transform the second set of data points by applying the change in position or the change in rotation to the at least one point in the second set of data points to generate a transformed set of data points.

In some implementations, the system can generate a combined set of data points including the first set of data points and the transformed set of data points. In some implementations, the system can down-sample at least one of the first set of data points or the second set of data points. In some implementations, the system can match at least one first point of the first set of data points to at least one second point of the second set of data points.

At least one other aspect of the present disclosure relates to a method for down-sampling three-dimensional point cloud data. The method can include accessing a set of data points corresponding to a point cloud representing a surface of an object. The method can include applying a response function to the set of data points to assign respective set of responses value to the set of data points. The method can include selecting a subset of the set of data points using a selection policy and the set of response values. The method can include generating a data structure including the subset of the set of data points.

In some implementations of the method, accessing the set of data points can include receiving three-dimensional image data from at least one capture device. In some implementations of the method, accessing the set of data points can include generating the point cloud representing the surface of the object using the 3D image data. In some implementations of the method, applying the response function to the set of data points can include generating a graph data structure using the set of data points corresponding to the point cloud representing the surface of the object. In some implementations of the method, applying the response function to the set of data points can include determining a graph filter as part of the response function.

In some implementations of the method, determining the graph filter can include generating a k-dimensional binary tree using the set of data points. In some implementations of the method, determining the graph filter can include generating the graph filter using the k-dimensional binary tree. In some implementations of the method, determining the graph filter can include generating the graph filter using a Euclidian distance between a pair of data points of the set of data points. In some implementations of the method, generating the graph filter using the Euclidian distance between the pair of data points of the set of data points can be further based on at least one color channel of the pair of data points of the set of data points.

In some implementations of the method, generating graph filter can include identifying an intensity parameter of the set of data points. In some implementations of the method, generating graph filter can include determining whether to generate the graph filter based on the at least one color channel of the pair of data points of the set of data points. In some implementations of the method, selecting the subset of the set of data points can include performing a weighted random selection using each response value of the set of response values as a weight. In some implementations of the method, the selection policy can be configured to select the subset of data points that correspond to one or more contours on the surface of the object. In some implementations of the method, it can include further including storing the data structure including the subset of the set of data points in a memory.

At least one other aspect of the present disclosure relates to a system configured for down-sampling three-dimensional point cloud data. The system can include one or more processors configured by machine-readable instructions. The system can access a set of data points corresponding to a point cloud representing a surface of an object. The system can apply a response function to the set of data points to assign respective set of responses value to the set of data points. The system can select a subset of the set of data points using a selection policy and the set of response values. The system can generate a data structure including the subset of the set of data points.

In some implementations, the system can receive three-dimensional image data from at least one capture device. In some implementations, the system can generate the point cloud representing the surface of the object using the 3D image data. In some implementations, the system can generate a graph data structure using the set of data points corresponding to the point cloud representing the surface of the object. In some implementations, the system can determine a graph filter as part of the response function. In some implementations, the system can generate a k-dimensional binary tree using the set of data points. In some implementations, the system can generating the graph filter using the k-dimensional binary tree.

In some implementations, the system can generate the graph filter using a Euclidian distance between a pair of data points of the set of data points. In some implementations, the system can generate the graph filter using the Euclidian distance between the pair of data points of the set of data points further based on at least one color channel of the pair of data points of the set of data points. In some implementations, the system can identify an intensity parameter of the set of data points. In some implementations, the system can determine whether to generate the graph filter based on the at least one color channel of the pair of data points of the set of data points.

In some implementations, the system can perform a weighted random selection using each response value of the set of response values as a weight. In some implementations, the selection policy can be configured to cause the system to select the subset of data points that correspond to one or more contours on the surface of the object. In some implementations, system can store the data structure including the subset of the set of data points in a memory.

At least one other aspect of the present disclosure relates to a method of scheduling processing jobs for point cloud and image registration. The method can include identifying a first processing device having a first memory and a second multi-processor device having a second memory. The method can include identifying a first processing job for a first point cloud. The method can include determining to assign the first processing job to the second multi-processor device. The method can include allocating the information for the first processing job including first point cloud to the second memory. The method can include receiving a second processing job for a second point cloud. The method can include determining to assign the second processing job to the first processing device. The method can include allocating the information for the second processing job to the first memory. The method can include transferring, by the one or more processors to the second multi-processor device, first instructions to cause the second multi-processing device to perform the first processing job. The first instructions can be specific to the second multi-processing device. The method can include transferring, by the one or more processors to the first processing device, second instructions to cause the first processing device to perform the second processing job. The second instructions can be specific to the first processing device.

In some implementations of the method, determining to assign the first processing job to the second multi-processor device can include determining that the first processing job includes operations for feature detection in the first point cloud. In some implementations of the method, determining to assign the first processing job to the second multi-processor device can be further based on at least one of a number of data points of the first point cloud being less than a predetermined threshold, a utilization amount of the second multi-processor device being less than a predetermined threshold, or a processing complexity of the first job exceeding a complexity threshold. In some implementations of the method, identifying the first processing job for the first point cloud can include receiving the first point cloud from a first capture device.

In some implementations of the method, identifying the second processing job for the second point cloud can be responsive to identifying the first processing job for the first point cloud. In some implementations of the method, the first processing job or the second processing job can include at least one of a down-sampling operation, a normalization operation, a feature detection operation, a contour detection operation, a registration operation, or a rendering operation. In some implementations of the method, the second point cloud can be extracted from at least one of an image captured from a capture device or a 3d medical image. In some implementations of the method, determining to assign the second processing job to the first processing device can be responsive to determining that the second point cloud is extracted from a 3d medical image.

In some implementations of the method, the first processing job can be associated with a first priority value. In some implementations of the method, the second processing job can be associated with a second priority value. In some implementations of the method, it can include, and further including determining to assign the second processing job to the first processing device is responsive to determining that the first priority value is greater than the second priority value. In some implementations of the method, each of the first priority value can be based on a first frequency that the first processing job is performed. In some implementations of the method, the second priority value can be based on a second frequency that the second processing job is performed.

At least one other aspect of the present disclosure relates to a system for scheduling processing jobs for point cloud and image registration. The system can include one or more processors configured by machine-readable instructions. The system can identify a first processing device having a first memory and a second multi-processor device having a second memory. The system can identify a first processing job for a first point cloud. The system can determine to assign the first processing job to the second multi-processor device. The system can allocate the information for the first processing job including first point cloud to the second memory. The system can receive a second processing job for a second point cloud. The system can determine to assign the second processing job to the first processing device. The system can allocate the information for the second processing job to the first memory. The system can transfer, by the one or more processors to the second multi-processor device, first instructions to cause the second multi-processing device to perform the first processing job. The first instructions can be specific to the second multi-processing device. The system can transfer, by the one or more processors to the first processing device, second instructions to cause the first processing device to perform the second processing job. The second instructions can be specific to the first processing device.

In some implementations, the system can determine that the first processing job includes operations for feature detection in the first point cloud. In some implementations, the system can determine to assign the first processing job to the second multi-processor device can be based on at least one of a number of data points of the first point cloud being less than a predetermined threshold, a utilization amount of the second multi-processor device being less than a predetermined threshold, or a processing complexity of the first job exceeding a complexity threshold. In some implementations, the system can receive the first point cloud from a first capture device.

In some implementations, the system can identify the second processing job for the second point cloud in response to identifying the first processing job for the first point cloud. In some implementations of the system, the first processing job or the second processing job can include at least one of a down-sampling operation, a normalization operation, a feature detection operation, a contour detection operation, a registration operation, or a rendering operation. In some implementations, the system can extract the second point cloud from at least one of an image captured from a capture device or a 3d medical image. In some implementations, the system can determine to assign the second processing job to the first processing device in response to determining that the second point cloud is extracted from a 3d medical image.

In some implementations of the system, the first processing job can be associated with a first priority value. In some implementations of the system, the second processing job can be associated with a second priority value. In some implementations, the system can determine to assign the second processing job to the first processing device in response to determining that the first priority value is greater than the second priority value. In some implementations of the system, the first priority value can be based on a first frequency that the first processing job is performed, and the second priority value can be based on a second frequency that the second processing job is performed.

At least one other aspect of the present disclosure relates to a method for registering a three-dimensional medical image with a point cloud. The method can include accessing a first set of data points of a first point cloud representing a global scene having a first reference frame. The method can include identifying a set of feature data points of features of a three-dimensional medical image having a second reference frame different from the first reference frame. The method can include determining a transformation data structure for the 3D medical image using the first reference frame, the first set of data points, and the set of feature data points. The method can include registering the 3D medical image with the first point cloud representing the global scene using the transformation data structure such that the 3D medical image is positioned relative to the first reference frame.

In some implementations of the method, determining the transformation data structure can include down-sampling the first set of data points to generate a reduced first set of data points. In some implementations of the method, determining the transformation data structure can include determining the transformation data structure for the 3D medical image using the reduced first set of data points. In some implementations of the method, determining the transformation data structure can further include generating the transformation data structure to include a change in position or a change in rotation of the 3D medical image. In some implementations of the method, registering the 3D medical image with the first point cloud representing the global scene can further include applying the change in position or the change in rotation to the 3D medical image to align the features of the 3D medical image with corresponding points in the first point cloud.

In some implementations of the method, identifying the set of feature data points of the features of the 3D medical image can include assigning weight values to each data point in the medical image to generate a respective set of weight values. In some implementations of the method, identifying the set of feature data points of the features of the 3D medical image can include selecting the data points of the 3D medical image that correspond to weight values that satisfy a weight value threshold as the set of feature data points. In some implementations of the method, it can include further including displaying responsive to registering the 3D medical image with the first point cloud, a render of the first point cloud and the 3D medical image. In some implementations of the method, it can include receiving tracking data from a surgical instrument. In some implementations of the method, it can include transforming the tracking data form the surgical instrument to the first reference frame to generate transformed tracking data. In some implementations of the method, it can include rendering the transformed tracking data within the render of the first point cloud and the 3D medical image.

In some implementations of the method, it can include determining a location of interest within the first reference frame related to the first point cloud and the 3D medical image. In some implementations of the method, it can include generating movement instructions for a surgical instrument based on the first point cloud, the 3D medical image, and the location of interest. In some implementations of the method, it can include transmitting the movement instructions to the surgical instrument. In some implementations of the method, it can include further including displaying a highlighted region within the render of the 3D medical image and the first point cloud that corresponds to a location of interest. In some implementations of the method, it can include further including determining a distance of a patient represented in the 3D medical image from a capture device responsible at least in part for generating the first point cloud.

At least one other aspect of the present disclosure relates to a system configured for registering a three-dimensional medical image with a point cloud. The system can include one or more processors configured by machine-readable instructions. The system can access a first set of data points of a first point cloud representing a global scene having a first reference frame. The system can identify a set of feature data points of features of a three-dimensional medical image having a second reference frame different from the first reference frame. The system can determine a transformation data structure for the 3D medical image using the first reference frame, the first set of data points, and the set of feature data points. The system can register the 3D medical image with the first point cloud representing the global scene using the transformation data structure such that the 3D medical image is positioned relative to the first reference frame.

In some implementations, the system can down-sample the first set of data points to generate a reduced first set of data points. In some implementations, the system can determine the transformation data structure for the 3D medical image using the reduced first set of data points. In some implementations, the system can generate the transformation data structure to include a change in position or a change in rotation of the 3D medical image. In some implementations, the system can apply the change in position or the change in rotation to the 3D medical image to align the features of the 3D medical image with corresponding points in the first point cloud.

In some implementations, the system can assign weight values to each data point in the medical image to generate a respective set of weight values. In some implementations, the system can select the data points of the 3D medical image that correspond to weight values that satisfy a weight value threshold as the set of feature data points. In some implementations, the system can display a render of the first point cloud and the 3D medical image responsive to responsive to registering the 3D medical image with the first point cloud. In some implementations, the system can receive tracking data from a surgical instrument. In some implementations, the system can transform the tracking data form the surgical instrument to the first reference frame to generate transformed tracking data. In some implementations, the system can render the transformed tracking data within the render of the first point cloud and the 3D medical image.

In some implementations, the system can determine a location of interest within the first reference frame related to the first point cloud and the 3D medical image. In some implementations, the system can generate movement instructions for a surgical instrument based on the first point cloud, the 3D medical image, and the location of interest. In some implementations, the system can transmit the movement instructions to the surgical instrument. In some implementations, the system can display a highlighted region within the render of the 3D medical image and the first point cloud that corresponds to a location of interest. In some implementations, the system can determine a distance of a patient represented in the 3D medical image from a capture device responsible at least in part for generating the first point cloud.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g. disks) or intangible carrier media (e.g. communications signals). Aspects can also be implemented using suitable apparatus, which can take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Below are detailed descriptions of various concepts related to, and implementations of, techniques, approaches, methods, apparatuses, and systems for real-time multiple modality image alignment. The various concepts introduced above and discussed in greater detail below can be implemented in any of numerous ways, as the described concepts are not limited to any particular manner of implementation. Examples of specific implementations and applications are provided primarily for illustrative purposes.

I. Overview

Systems and methods in accordance with the present solution can be used to perform real-time alignment of image data from multiple modalities, such as to align or register 3D image data with medical scan data. Some systems can use markers for registration, which can be bulky, require attachment to the subject, or interfere with one or more image capture devices. It can be difficult to operate such systems at high precision and in real-time, such as at sub-millimeter precision, due to the processing requirements in the image processing pipeline. In addition, various image processing operations can be highly sensitive to factors that affect the image data such as illumination, shadows, occlusion, sensor noise, and camera pose.

Systems and methods in accordance with the present solution can apply various image processing solutions to improve the speed at which image data from multiple sources is processed and aligned, which can improve performance and reduce processing hardware requirements for achieving desired performance benchmarks, without the use of markers. The present solution can enable precise, responsive, and easy-to-use surgical navigation platforms. For example, the present solution can enable 3D scans, such as CT or MRI scans, to be registered directly onto the subject (or image data representing the subject), as well as to track instruments, draw instrument trajectories, and highlight targets on the scans.

Figure 1:
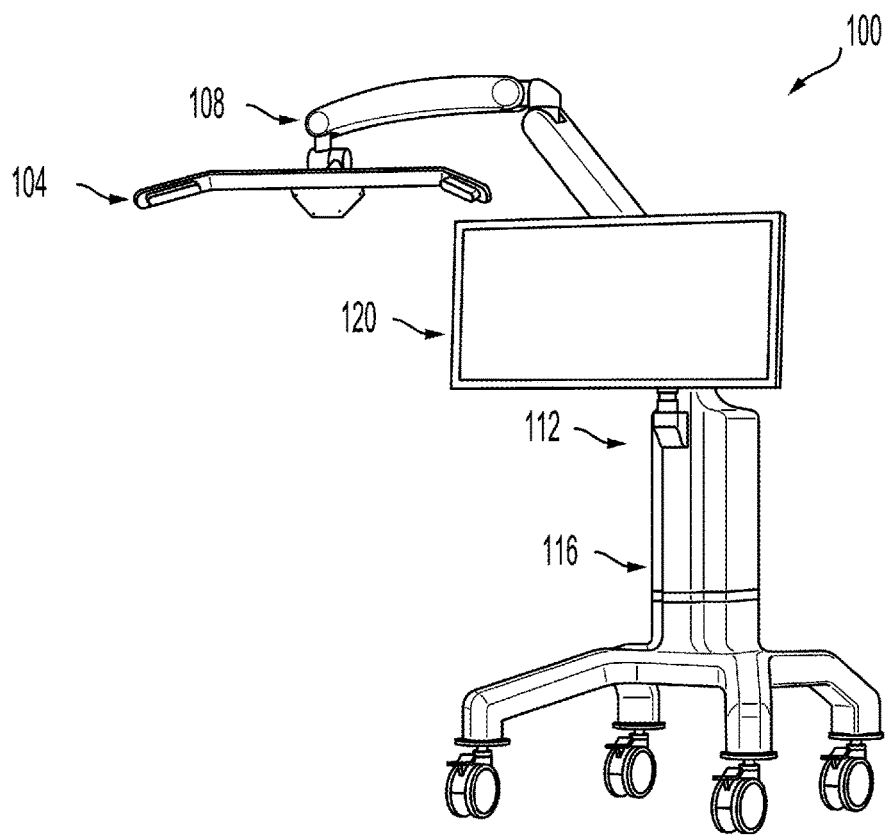
FIG. 1 is a perspective view of an image processing system according to an embodiment of the present disclosure.
Figure 2:
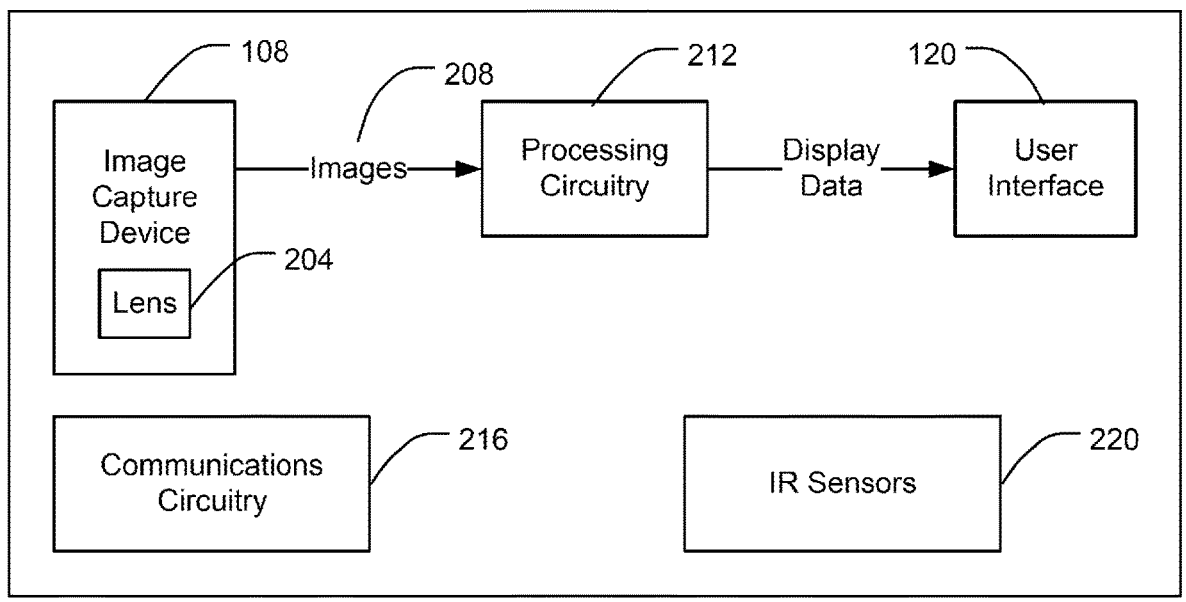
FIG. 2 is a block diagram of an image processing system according to an embodiment of the present disclosure.

FIGS. 1-2 depict an image processing system 100. The image processing system 100 can include a plurality of image capture devices 104, such as three-dimensional cameras. The cameras can be visible light cameras (e.g., color or black and white), infrared cameras, or combinations thereof. Each image capture device 104 can include one or more lenses 204. In some embodiments, the image capture device 104 can include a camera for each lens 204. The image capture devices 104 can be selected or designed to be a predetermined resolution and/or have a predetermined field of view. The image capture devices 104 can have a resolution and field of view for detecting and tracking objects. The image capture devices 104 can have pan, tilt, or zoom mechanisms. The image capture device 104 can have a pose corresponding to a position and orientation of the image capture device 104. The image capture device 104 can be a depth camera. The image capture device 104 can be the KINECT manufactured by MICROSOFT CORPORATION.

Light of an image to be captured by the image capture device 104 be received through the one or more lenses 204. The image capture devices 104 can include sensor circuitry, including but not limited to charge-coupled device (CCD) or complementary metal-oxide-semiconductor (CMOS) circuitry, which can detect the light received via the one or more lenses 204 and generate images 208 based on the received light.

The image capture devices 104 can provide images 208 to processing circuitry 212, for example via a communications bus. The image capture devices 104 can provide the images 208 with a corresponding timestamp, which can facilitate synchronization of the images 208 when image processing is executed on the images 208. The image capture devices 104 can output 3D images (e.g., images having depth information). The images 208 can include a plurality of pixels, each pixel assigned spatial position data (e.g., horizontal, vertical, and depth data), intensity or brightness data, and/or color data.

Each image capture device 104 can be coupled with respective ends of one or more arms 108 that can be coupled with a platform 112. The platform 112 can be a cart that can include wheels for movement and various support surfaces for supporting devices to be used with the platform 112.

The arms 108 can change in position and orientation by rotating, expanding, contracting, or telescoping, enabling the pose of the image capture devices 104 to be controlled. The platform 112 can support processing hardware 116 that includes at least a portion of processing circuitry 212, as well as user interface 120. Images 208 can be processed by processing circuitry 212 for presentation via user interface 120.

Processing circuitry 212 can incorporate features of computing device 1300 described with reference to FIGS. 13A and 13B. For example, processing circuitry 212 can include processor(s) and memory. The processor can be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory can be or include volatile memory or non-volatile memory and can include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems and methods described herein.

Some portions of processing circuitry 212 can be provided by one or more devices remote from platform 112. For example, one or more servers, cloud computing systems, or mobile devices (e.g., as described with reference to FIGS. 13A and 13B), can be used to perform various portions of the image processing pipeline described herein.

The image processing system 100 can include communications circuitry 216. The communications circuitry 216 can implement features of computing device 1300 described with reference to FIGS. 13A and 13B, such as network interface 1318.

The image processing system 100 can include one or more infrared (IR) sensors 220. The IR sensors 220 can detect IR signals from various devices in an environment around the image processing system 100. For example, the IR sensors 220 can be used to detect IR signals from IR emitters that can be coupled with instruments in order to track the instruments. The IR sensors 220 can be communicatively coupled to the other components of the image processing system 100, such that the components of the image processing system 100 can utilize the IR signals in appropriate operations in the image processing pipeline, as described herein below.

Figure 3:
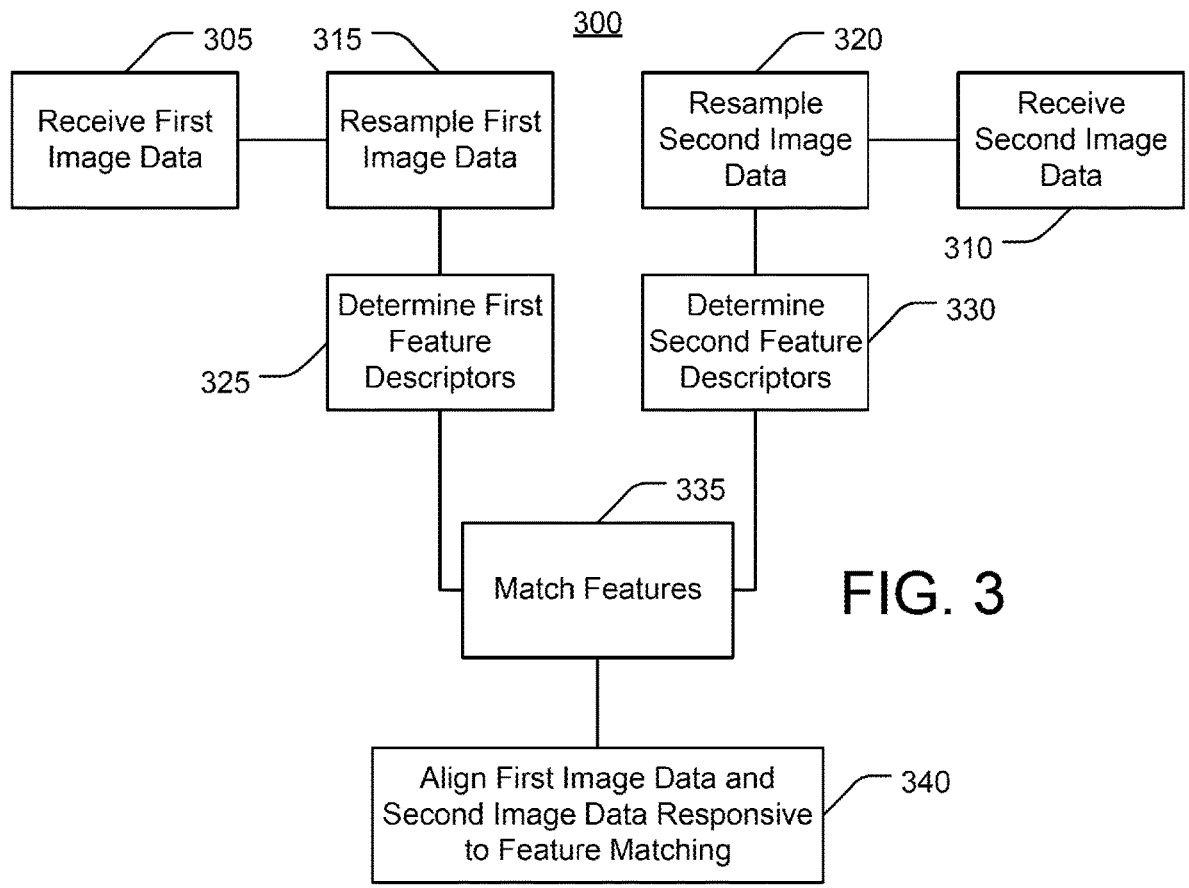
FIG. 3 is a flow diagram of a method for aligning image data from multiple modalities according to an embodiment of the present disclosure.

FIG. 3 depicts an image processing pipeline 300 that the image processing system 100 can perform using image data of one or more image modalities. Various features of the image processing pipeline 300 that can enable the image processing system 100 to perform real-time image alignment with high precision are described further herein.

In some embodiments, a setup procedure can be performed to enable the image processing system 100 to perform various functions described herein. For example, the platform 112 can be positioned in proximity to a subject, such as a patient. The image capture devices 104 can be positioned and oriented in various poses to detect image data regarding the subject. The image capture devices 104 can be located in different poses, such as to face the subject from multiple directions, which can improve the quality of image data generated by fusing the image data from the image capture devices 104.

At 305, first image data can be received. The first image data can be model data (e.g., medical scan data, DICOM data), such as CT, MM, ultrasound, or CAD data. The model data can be received via a network of a healthcare facility, such as a network connected with a picture archiving and communication system (PACS), from a remote source (e.g., cloud server), or can be in memory of processing circuitry 216. The model data can be intra-operation data (e.g., detected while a procedure is being performed on the subject) or pre-operative data.

At 310, second image data can be received. The second image data can be of a different modality than the first image data. For example, the second image data can be 3D image data from a 3D camera.

At 315, the first image data can be resampled, such as to be down-sampled. The first image data can be resampled in a manner that retains key features of the first image data while decreasing data complexity of the first image data, increasing the efficiency of further operations performed on the first image data. Similarly, at 320, the second image data can be resampled. Resampling can include identifying features that are not relevant to image registration in the image data and removing them to generate a reduced or down-sampled image.

At 325, one or more first feature descriptors can be determined regarding the resampled first image data. The feature descriptors can be determined to relate to contours or other features of the resampled first image data corresponding to 3D surfaces represented by the resampled first image data. Similarly, at 330, one or more second feature descriptors can be determined regarding the second image data.

At 335, feature matching can be performed between the one or more first feature descriptors and the one or more second feature descriptors. For example, feature matching can be performed by comparing respective first feature descriptors and second feature descriptors to determine a match score, and identifying matches responsive to the match score meeting a match threshold.

At 340, one or more alignments can be performed between the first image data and the second image data responsive to the feature matching. The one or more alignments can be performed to transform at least one of the first image data or the second image data to a common frame of reference.

II. Systems and Methods for Aligning Multiple Depth Cameras in an Environment Based on Image Data Using multiple depth cameras, such as 3D cameras, can improve the quality of the 3D image data gathered regarding a subject and an environment around the subject. However, it can be difficult to align the image data from the various depth cameras, which can be located in different poses. The present solution can effectively determine a frame of reference for transforming various point cloud data points and aligning the point cloud data points to the frame of reference in order to generate aligned image data.

Referring back now to FIGS. 1 and 2, the image processing system 100 can utilize the image capture devices 104 as 3D cameras to capture real-time 3D image data of a subject. For example, the image capture devices 104 can each capture at least one 3D image of a subject, object, or environment. This environment can include other features that can not be medically to a subject that is present in the environment. The 3D images can be made up of a number, or set, of points in a reference frame that is provided by the image capture device. The set of points that make up the 3D image can have color information. In some implementations, this color information is discarded and not used in further processing steps. Each set of points captured by a respective image capture device 104 can be referred to as a "point cloud". If multiple image capture devices 104 are utilized to capture an image of the subject, each of the image capture devices 104 can have a different frame of reference. In some implementations, the 3D images captured by the image capture devices 104 can not be recorded in real-time. In such implementations, a single image capture device 104 can be used, and can capture a first 3D image at a first pose, and then be repositioned to second pose to capture a second 3D image of the subject.

Responsive to capturing at least one 3D image (e.g., as at least one of the images 208, etc.), the image capture devices 104 can provide images 208 to processing circuitry 212, for example via a communications bus. The image capture devices 104 can provide the images 208 with a corresponding timestamp, which can facilitate synchronization of the images 208 when image processing is executed on the images 208. The image capture devices 104 can output 3D images (e.g., images having depth information). The images 208 can include a plurality of pixels, each pixel assigned spatial position data (e.g., horizontal, vertical, and depth data), intensity or brightness data, or color data. In some implementations, the processing circuitry 212 can store the images 208 in the memory of the processing circuitry 212. For example, storing the images 208 can include indexing the images 208 in one or more data structures in the memory of the processing circuitry 212.

The processing circuitry 212 access a first set of data points of a first point cloud captured by a first capture device 104 having a first pose, and a second set of data points of a second point cloud captured by a second capture device 104 having a second pose different from the first pose. For example, each of the 3D images (e.g., the images 208) can include one or more 3D dimensional data points that make up a point cloud. The data points can correspond to a single pixel captured by the 3D camera, and can be at least a three-dimensional data point (e.g., containing at least three coordinates, each corresponding to a dimension). The three dimensional data points can include the at least three coordinates within a frame of reference that is indicated in the respective image 208. As such, different image capture devices 104 at different poses can produce 3D images in different reference frames. To improve the overall accuracy and feature density of the system as 3D images of the subject are captured, the system can align the point clouds of 3D images that are captured by the image capture devices 104 to produce a single combined 3D image. The three-dimensional data points that make up one of the images 208 can be considered together as a single "point cloud".

The processing circuitry 212 can extract the three-dimensional data from each data point in the images 208 received from the image capture devices 104 to generate a first point cloud corresponding to a first image capture device 104 and a second point cloud corresponding to a second image capture device 104. Extracting the three-dimensional data from the point cloud can include only accessing and extracting (e.g., copying to a different region of memory in the processing circuitry 212, etc.) just the three coordinates (e.g., x-axis, y-axis, and z-axis, etc.) of the data points in the 3D image. Such a process can remove or discard any color or other irrelevant information in further processing steps.

In some implementations, to improve the overall computational efficiency of the system, the processing circuitry can down-sample, or selectively discard certain data points that make up the 3D image to generate a down-sampled set of data points. The processing circuitry 212 can selectively remove data points uniformly, for example by discarding (e.g., not extracting a data point from the image, etc.) one out of every four data points (e.g., 75% of points are uniformly extracted, etc.) in the image. In some implementations, the processing circuitry 212 can extract a different percentage of points (e.g., 5%, 10%, 15%, 20%, any other percentage, etc.). Thus, when extracting or accessing the data points in the point clouds of the 3D images, the processing circuitry 212 can down-sample the point clouds to reduce their overall size without significantly affecting the accuracy of further processing steps, improving the image processing.

Responsive to the 3D image data from each of the image capture devices 104 being translated, or otherwise accessed as two or more point clouds, the processing circuitry 212 can select one of the point clouds to act as the baseline reference frame for the alignment of any of the other point clouds. To improve the accuracy and overall resolution of the point clouds that represent the surface of the subject in the environment, two or more image capture devices 104 can capture 3D images of the subject. The processing circuitry 212 can combine the images such they exist within a single reference frame. For example, the processing circuitry 212 can select one of the point clouds corresponding to one 3D image captured by a first image capture device 104 as the reference frame. Selecting the point cloud as the reference frame can include copying the selected point cloud (e.g., the data points and coordinates that make up the point cloud, etc.) to a different region of memory. In some implementations, selecting the point cloud can include assigning a memory point to at least part of the memory of the processing circuitry 212 in which the selected point cloud is stored.

Selecting the reference frame can include retrieving color data assigned to one or more of the first set of data points of the first point cloud. For example, the processing circuitry 212 can extract the color data (e.g., red/green/blue (RGB) values, cyan/yellow/magenta/intensity (CMYK) values, etc.) from the pixels or data points in the 3D images 208 received from the image capture devices 104 and store the color data in the data points for the respective point cloud. The processing circuitry 212 can determine if one frame of reference is more evenly illuminated by comparing the color data of each data point to a brightness value (e.g., a threshold for the average color value, etc.). The processing circuitry 212 can perform this comparison for a uniform number of data points in each point cloud, for example by looping through every N number of data points and comparing the color threshold to the color data in each data point. In some implementations, the processing circuitry 212 can average the color data across the data points in each point cloud to calculate an average color intensity value. Responsive to the average color intensity value being greater than a predetermined threshold, the processing circuitry 212 can determine that a point cloud is evenly illuminated.

In some implementations, the processing circuitry 212 can select the reference frame by determining the most illuminated (e.g., most uniformly illuminated) point cloud. The point cloud with the most uniformly illuminated (e.g., and therefore a quality image) can be selected as the reference frame for further alignment computations. In some implementations, the processing circuitry can select the reference frame as the reference frame of the point cloud that is the least uniformly illuminated. In some implementations, the processing circuitry 212 can arbitrarily (e.g., using a pseudo-random number, etc.) choose a reference frame of a point cloud as the reference frame.

The processing circuitry 212 can determine a transformation data structure for the second set of data points using the reference frame and the first set of data points. The transformation data structure can include one or more transformation matrices. The transformation matrices can be, for example, 4-by-4 rigid transformation matrices. To generate the transformation matrices of the transformation data structure, the processing circuitry 212 can identify one or more feature vectors, for example by performing one or more of the steps of method 900 described herein below in conjunction with FIG. 9. The result of this process can include a set of feature vectors for each point cloud, where one point cloud is used as a frame of reference (e.g., the points of that cloud will not be transformed). The processing circuitry 212 can generate the transformation matrices such that when each matrix is applied (e.g. used to transform) a respective point cloud, the features of the transformed point cloud will align with similar features in the reference frame point cloud.

To generate the transformation matrices (e.g., as part of or as the transformation data structure), the processing circuitry 212 can access, or otherwise retrieve from the memory of the processing circuitry 212, the features that correspond to each point cloud. To find points in the reference frame point cloud that correspond to those of a point cloud to be transformed, the processing circuitry 212 can compute an $L^2$ distance between feature vectors in each point cloud. Computing the $L^2$ distance of the points of the features in each point cloud returns a list of initial (and potentially inaccurate) correspondences for each point. A correspondence can indicate that a data point corresponds to the same position on the surface of the object represented in each point cloud. After these initial correspondences have been enumerated, the processing circuitry 212 can apply a random sample consensus (RANSAC) algorithm to identify and reject inaccurate correspondences. The RANSAC algorithm can be used to iteratively identify and fit correspondences between each point cloud using the list of initial correspondences.

The RANSAC algorithm can be used to determine which correspondences in the features of both point clouds are relevant to the alignment process and which are false correspondences (e.g., features in one point cloud that are falsely identified as corresponding to features in the point cloud to be transformed or aligned). The RANSAC algorithm can be iterative, and can reject the false correspondences between the two point clouds until a satisfactory model is fit. The satisfactory model that is output can identify each of the data points in the reference point cloud that have corresponding data points in the point cloud to be transformed, and vice versa.

In performing the RANSAC algorithm, the processing circuitry 212 can select a sample subset of feature correspondences containing minimal correspondences randomly (e.g. pseudo-randomly, etc.) from the full set of initial correspondences identified using the $L^2$ distances between feature vectors. The processing circuitry 212 can compute a fitting model and the corresponding model parameters using the elements of this sample subset. The cardinality of the sample subset can be the smallest sufficient to determine the model parameters. The processing circuitry 212 can check which elements of the full set of correspondences are consistent with the model instantiated by the estimated model parameters. A correspondence can be considered as an outlier if it does not fit the fitting model instantiated by the set of estimated model parameters within some error threshold (e.g., 1%, 5%, 10%, etc.) that defines the maximum deviation attributable to the effect of noise. The set of inliers obtained for the fitting model can be called the consensus set of correspondences. The processing circuitry 212 can iteratively repeat the steps of the RANSAC algorithm until the obtained consensus set in a certain iteration has enough inliers (e.g., greater than or equal to a predetermined threshold, etc.). The consensus set can be an accurate list of correspondences between the data points in each point cloud that fit the parameters for the RANSAC algorithm. The parameters for the RANSAC algorithm can be predetermined parameters. The consensus set can then be used in an iterative closest point (ICP) algorithm to determine the transformation data structure.

The processing circuitry 212 can perform the ICP algorithm using the consensus set of corresponding features generated by using the RANSAC algorithm. Each corresponding feature in the consensus set can include one or more data points in each point cloud. When performing the ICP algorithm, the processing circuitry 212 can match the closest point in the reference point cloud (or a selected set) to the point closet point in the point cloud to be transformed. The processing circuitry 212 can then estimate the combination of rotation and translation using a root mean square point to point distance metric minimization technique which will best align each point in the point cloud to be transformed to its match in the reference point cloud. The processing circuitry 212 can transform the points in the point cloud to determine an amount of error in between the features in the point cloud, and iterate using this process to determine an optimal transformation values for position and rotation of the point cloud to be transformed. These output values can be assembled in a transformation matrix, such as a 4-by-4 rigid transformation matrix. This output transformation matrix can be the transformation data structure.

The processing circuitry 212 transform the set of data points in the point cloud to be transformed using the transformation data structure to create a transformed set of data points. The transformation data structure can include one or more transformation matrices. The transformation matrices include transformation values that indicate a change in position or rotation of the points in the point cloud to be transformed. The processing circuitry 212 can apply (e.g., offset a position or apply a rotation around a reference point, etc.) the values in the transformation data structure to each point in the point cloud to be transformed to alter its respective position or rotation. This transformed point cloud can then be in the same frame of reference as the point cloud selected as the reference frame.

The processing circuitry 212 can generate a combined set of data points including the first set of data points and the transformed set of data points. In some implementations, the combined set of data points can include all of the data points in the reference point cloud and the transformed point cloud. Because the data points represent a capture of the same subject from two different angles, the processing circuitry 212 can assemble a more complete 3D point-based image using the combined set of data points. For example, each of the combined set of data points can represent a 3D image of the subject under analysis. This 3D image can be translated into display data (e.g., a 3D point based mesh rendered using 3D rendering techniques, etc.) and provided to the user interface 120 for display. The processing circuitry 212 can store the combined set of data points in the memory of the processing circuitry 212 for further processing.

Figure 4:
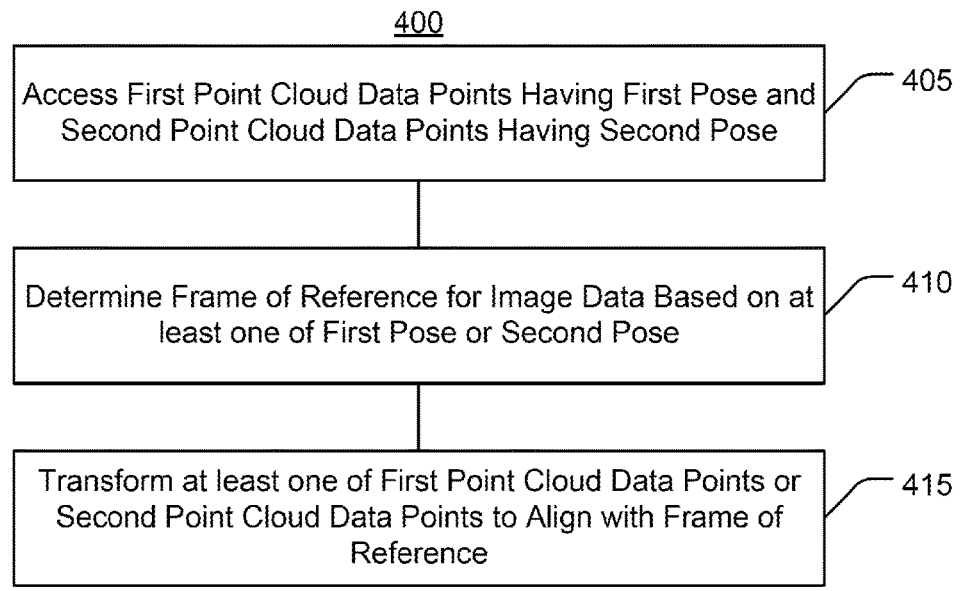
FIG. 4 is a flow diagram of a method for aligning multiple depth cameras in an environment based on image data according to an embodiment of the present disclosure.

Referring now to FIG. 4, depicted is a flowchart of a method 400 for aligning multiple depth cameras in an environment based on image data. The method 400 can be performed using various devices and systems described herein, such as the image processing system 100 or the components or modules thereof described herein above in conjunction with FIGS. 1 and 2.

At 405, first point cloud data points and second point cloud data points are accessed. Point cloud data points can include spatial coordinates and various parameters assigned to the spatial coordinates. For example, point cloud data points can include spatial coordinates in a particular frame of reference (e.g., Cartesian coordinates; cylindrical coordinates; spherical coordinates). Point cloud data points can indicate information such as brightness or intensity, grayscale data, color data (e.g., RGB, CYMK), density, or various combinations thereof. In some embodiments, image data is processed to generate the point cloud data points.

The first point cloud data points can correspond to a first pose relative to a subject and the second point cloud data points can correspond to a second pose relative to the subject. The pose can represent a position and orientation of a device that detected the image data corresponding to the point cloud data point, such as an image capture device (e.g., camera), MRI machine, or CT machine.

At least one of the first pose or the second pose can be determined based on pose data received from the respective image capture device. For example, the pose can be determined based on data received from a position sensor (e.g., accelerometer) coupled with the image capture device.

At least one of the first pose or the second pose can be determined based on image data captured by one or more image capture devices in the environment around the subject. For example, the image data captured by a first image capture device can be processed to identify a second image capture device if the second image capture device is in a field of view of the first image capture device. The pose of the second image capture device can be determined from the image data in which the second image capture device is identified.

At 410, a frame of reference is determined for image data based on at least one of the first pose or the second pose. The frame of reference can be determined by comparing the first point cloud data points to the second point cloud data points. For example, the point cloud data, or features extracted from the point cloud data, can be compared, a match score can be generated based on the comparison (e.g., to determine similarity), and an alignment transform can be determined based on the match score.

In some embodiments, color data from the point cloud data points can be used to determine the frame of reference. For example, in addition to intensity or brightness values, data from one or more color channels assigned to each point cloud data point can be used when comparing point cloud data points, which can increase the precision of the match scores generated based on the comparisons.

At 415, at least one of the first point cloud data points or the second point cloud data points are transformed to align with the frame of reference. For example, if the frame of reference corresponds to the first pose (or the second pose), the second point cloud data points (or the first point cloud data points) can be transformed to align with the frame of reference. In some embodiments, the frame of reference is different than each of the first and second poses, and the first point cloud data points and second point cloud data points can each be transformed to align with the frame of reference.

In some embodiments, color data is not used when transforming point cloud data points. For example, the transformation can be applied to the spatial coordinates of the point cloud data points and not to the color data. The color data can be discarded prior to transforming point cloud data points, or can be retained in the point cloud data structure for later retrieval.

III. Systems and Methods for Segmenting Surfaces of a Medical Image

Segmenting images, such as medical images or 3D images, can improve the efficiency of further operations performed on the images in an image processing pipeline. However, it can be difficult to segment images in a manner that is computationally efficient while also retaining information that is relevant to the application for which the image processing is being performed. The present solution can implement segmentation models that can effectively retain anatomically relevant information and improve computational efficiency. For example, the present solution can implement segmentation models that effectively distinguish the surface of a subject, including anatomical features thereof, from the surrounding environment, such as by identifying differences in density between the surface of the subject and surrounding air, or using machine learning models trained to classify point cloud data points as corresponding to the surface of the subject.

Figure 5:
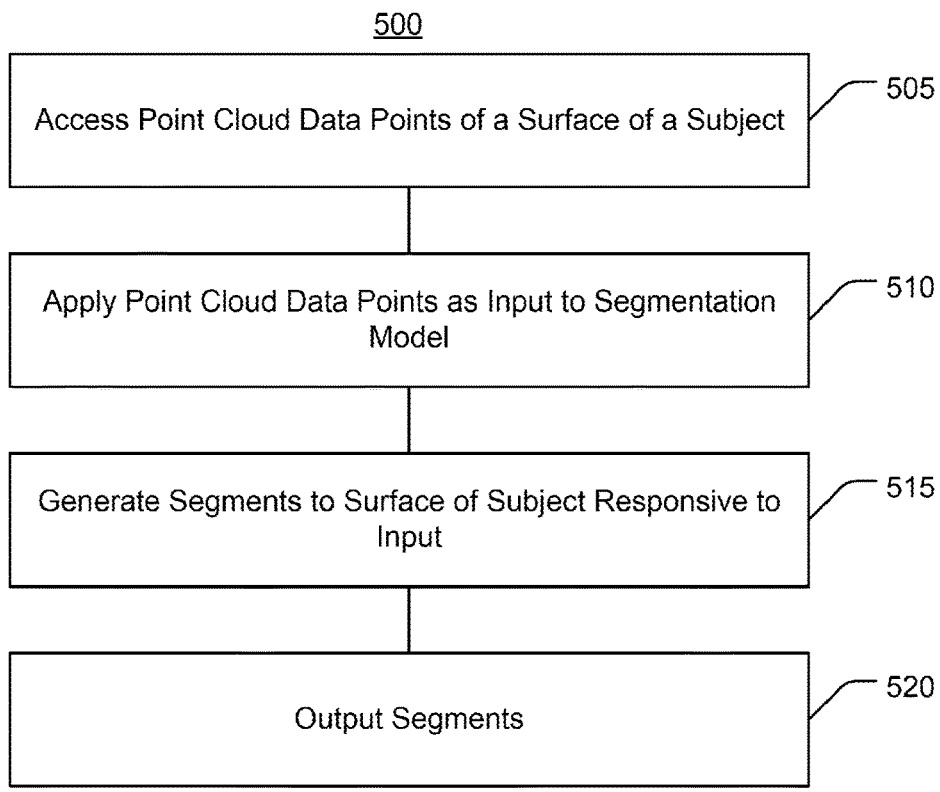
FIG. 5 is a flow diagram of a method for segmenting surfaces of a medical image according to an embodiment of the present disclosure.

FIG. 5 depicts a method 500 for segmenting surfaces of a medical image. The method 500 can be performed using various devices and systems described herein, such as the image processing system 100.

At 505, point cloud data points are accessed. The point cloud data points can correspond to a surface of a subject. For example, the point cloud data points can correspond to medical images or 3D images of the subject detected by 3D cameras, MRI devices, or CT devices.

At 510, the plurality of point cloud data points are applied as an input to a segmentation model. The segmentation model can include one or more functions that generate segments based on density data indicated by the image data of the point cloud data points (e.g., segmenting the surface from air based on intensity data of the point cloud data points). The segments can be regions of pixels or groups of data points that share similar characteristics, such as regions of pixels or groups of data points that represent the surface of an object from the air surrounding the object.

In some embodiments, the segmentation model includes a machine learning model. The machine learning model can be trained using training data that includes predetermined images (e.g., predetermined image data) and labeled segments (e.g., predetermined segments) associated with the images. For example, the machine learning model can include a neural network trained to generate output data that includes one or more segments based on input data that includes image data, such as point cloud data points.

At 515, the plurality of segments are generated. The segments can be generated using the segmentation model. The segments can correspond to the surface of the subject responsive to the input to the segmentation model.

At 520, the plurality of segments are outputted. The segments can be outputted to generate a 3D surface model of the surface of the subject IV. Systems and Methods for Generating a 3D Surface Model from a Medical Image Based on Segmentation 3D surface models based on medical images, such as MIll or CT scans, can be used for various applications including surgical navigation and planning and instrument tracking. In order to effectively render and perform image processing operations using 3D surface models, it can be useful to generate the 3D surface model from segmentation of the underlying 3D image data. For example, a triangular or quadrangular 3D surface model can be generated from segments that are generated using a segmentation model as described herein. Point cloud data can be generated from the 3D surface model or directly from the segmentation data (e.g., from the segments generated by the segmentation model).

Figure 6:
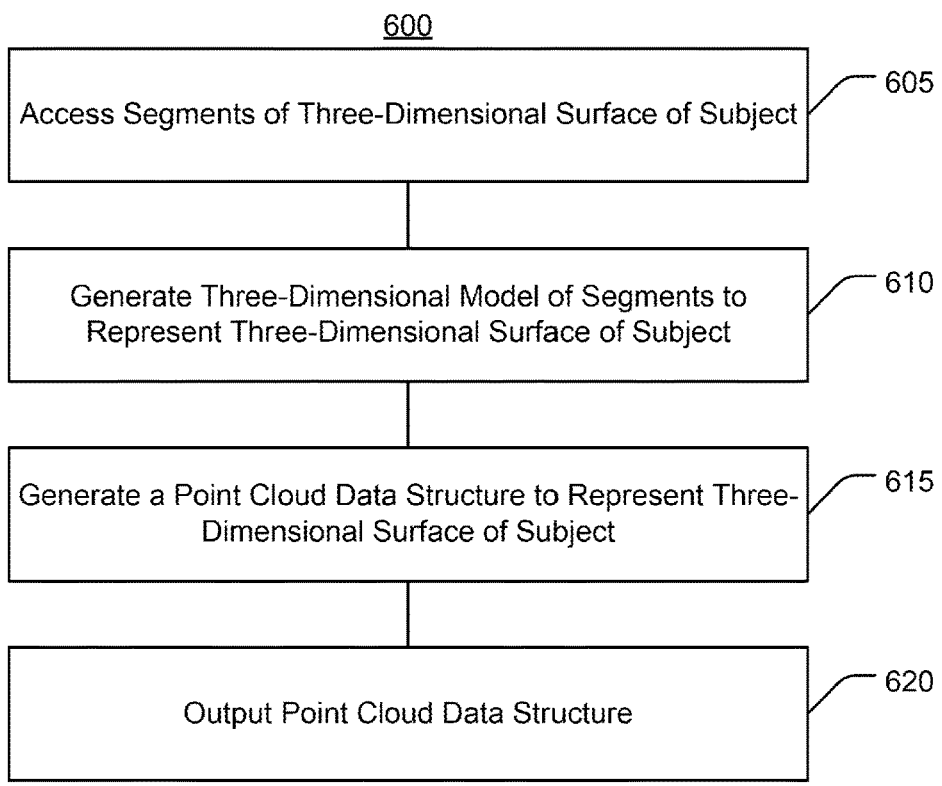
FIG. 6 is a flow diagram of a method for generating a 3D surface model from a medical image based on segmentation according to an embodiment of the present disclosure.

FIG. 6 depicts a method 600 for generating a 3D surface model from a medical image based on segmentation. The method 600 can be performed using various devices and systems described herein, such as the image processing system 100.

At 605, a plurality of segments are accessed. The segments can correspond to a three-dimensional surface of a subject. For example, the segments can be generated from image data representative of the surface, such as 3D point cloud data points corresponding to images detected of the surface.

At 610, a three-dimensional model of the plurality of segments is generated. The three-dimensional model can represent the three-dimensional surface of the subject. The 3D model can be generated as a triangular or quadrangular 3D surface model, such as by connecting points of the segments to form three-sided or four-sided surface portions.

At 615, a point cloud data structure is generated. The point cloud data structure can represent the three-dimensional surface of the subject. For example, the point cloud data structure can be generated by sampling points that form the surface portions of the surface generated using the segments. The point cloud data structure can include a plurality of point cloud data points corresponding to the surface portions.

At, 620, the point cloud data structure is outputted. The point cloud data structure can be outputted to represent the 3D surface model, such as for matching the 3D surface model with image data of other modalities (e.g., 3D image data).

Figure 7:
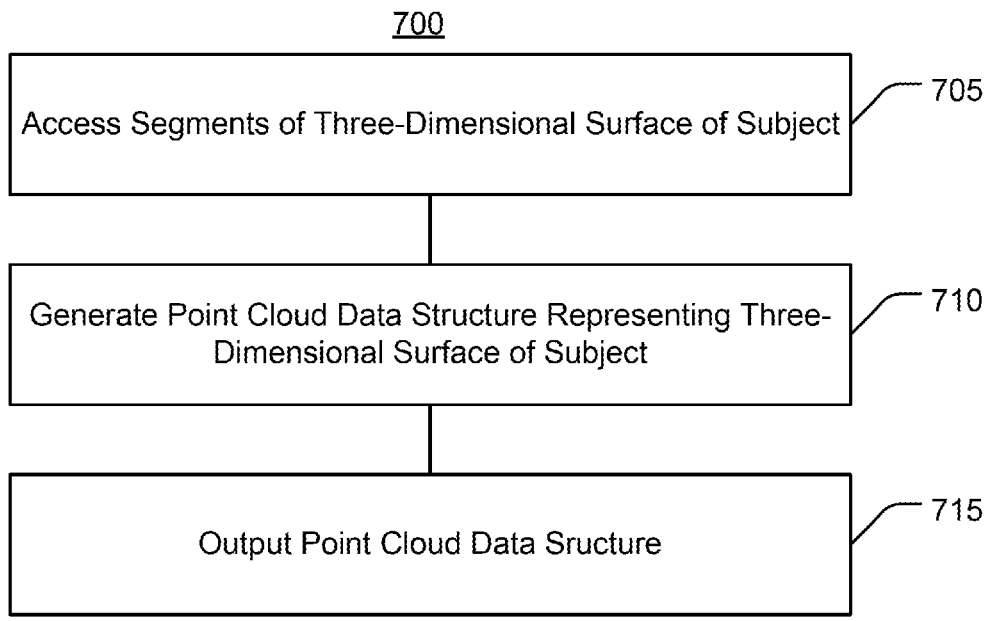
FIG. 7 is a flow diagram of a method for s generating a 3D surface model from a medical image based on segmentation according to an embodiment of the present disclosure.

FIG. 7 depicts a method 700 for generating a 3D surface model from a medical image based on segmentation. The method 700 can be performed using various devices and systems described herein, such as the image processing system 100. The method 700 can be similar to the method 600, while generating a point cloud representation of the surface of the subject directly from segmentation of the surface (e.g., rather than via a 3D surface model).

At 705, a plurality of segments are accessed. The segments can correspond to a three-dimensional surface of a subject. For example, the segments can be generated from image data representative of the surface, such as 3D point cloud data points corresponding to images detected of the surface.

At 710, a point cloud data structure is generated. The point cloud data structure can represent the three-dimensional surface of the subject. For example, the point cloud data structure can be generated by sampling points using the segments. The point cloud data structure can include a plurality of point cloud data points corresponding to the segments.

At 715, the point cloud data structure is outputted. The point cloud data structure can be outputted to represent the surface of the subject, such as for matching the 3D surface with image data of other modalities (e.g., 3D image data).

V. Systems and Methods for Down-Sampling a Point Cloud Generated from a 3D Surface Model for Improved Image Alignment Efficiency Point cloud data from multiple modalities can be compared and matched in order to align the point cloud data for various applications. However, the size and complexity of point cloud data representing 3D surfaces of a subject, 3D image data, and 3D models can make it difficult to effectively process this data in an image processing pipeline. For example, the KINECT manufactured by Microsoft Corporation can generate nine million point cloud data points per second. The runtime of image processing operations that use 3D point cloud data can be directly related to the density of the 3D point cloud data (including being slower than running in linear time). In addition, various image processing operations can be highly sensitive to environmental factors that affect the image data such as illumination, shadows, occlusion, and pose.

The present solution can effectively resample (e.g., down-sample) point clouds in a manner that effectively retains anatomically or otherwise physically relevant information and relationships between point cloud data points, such as to preserve contours and edges of objects, while reducing the computational complexity involved in further image processing. The present solution can decrease point cloud density to allow for faster image processing while retaining relevant information. As such, the present solution can enable real-time image processing that meets target performance criteria, such as sub-millimeter precision (e.g., retaining image data where distances between point cloud data points are less than one millimeter).

Referring back now to FIGS. 1 and 2, the image processing system 100 can resample, or down-sample, point clouds to improve computational efficiency in the image processing pipeline without significantly reducing the accuracy of image registration. By selectively reducing the total number of points that need to be processed to achieve a desired 3D image registration, the image processing system 100 can improve the speed of 3D image registration techniques while reducing overall computational requirements. The image processing system 100 can perform contour-based resampling of point cloud data, which can decrease the density of a point cloud of a 3D image (e.g., captured by the image capture devices, or extracted from a 3D medical image such as a CT scan or MRI image, etc.) while retaining relevant points and relationships between points, such as contours and edges. The relevant portions in the point cloud are those that have a greater impact or importance on the image registration processes described herein.

The processing circuitry 212 can access a set of data points corresponding to a point cloud representing a surface of an object. The 3D data points that make up a point cloud (e.g., as extracted from a 3D medical image, etc.) can be multi-dimensional data points that describe a set of coordinates in a particular reference frame. For example, a 3D data point of a point cloud (e.g., collection of data points) can include three coordinates (e.g., Cartesian coordinates, cylindrical coordinates, etc.). The data points can correspond to a single pixel captured by the 3D camera, and can be at least a three-dimensional data point (e.g., containing at least three coordinates, each corresponding to a spatial dimension). In some implementations, the data points can correspond to a point or vertex in a 3D medical image, such as a CT scan model or a MM image. In some implementations, the data points accessed (e.g., retrieved from one or more data structures in the memory of the by the processing circuitry 212, etc.) can be the combined set of data points generated from point clouds captured from two or more image capture devices 104. In some implementations, the processing circuitry 212 access or receive the set of data points from at least one of the image capture devices 104, for example in real-time as the image capture device 104 captures a 3D image of a subject or environment.

Accessing the set of data points can include generating the point cloud representing the surface of the object using the 3D image data. In some implementations, the processing circuitry 212 can receive or retrieve a 3D image or model that includes a set of 3D data points. These data points, along with other relevant point data (e.g., color, other factors such as temperature for each point) can be extracted from the 3D image or model. For example, in the case of the 3D model (e.g., a CT scan mesh or an MRI image model, etc.), the processing circuitry 212 can extract one or more slices or vertices using the data present in the 3D model. In some implementations, the processing circuitry 212 can generate the point cloud from the 3D model using the steps in method 600 or method 700, described herein above in conjunction with FIGS. 6 and 7.

The processing circuitry 212 can apply a response function to the set of data points to assign respective set of response values to the set of data points. The response function can be a function that takes a set of data points (e.g., from a point cloud), and generates response value based on the relationships between the input points. The response function can generate a response value for each input data point by applying one or more matrix operations to the points in the point cloud. The response values can be weight values that indicate whether the respective data point is part of a feature of interest, such as a contour. For example, because contours are more complex structures, they can be considered more relevant to image registration or the registration of two different point clouds. To determine the response value of each data point in a point cloud, the processing circuitry 212 can perform analysis on each data point with respect to one or more adjacent data points. For example, the processing circuitry 212 can apply the response function to generate response values that have greater weights based on the data points having a greater association with features of interest such as contours, edges, segments, or other image features that are likely to be representative of anatomical features or surgical instruments.

For example, the processing circuitry 212 can apply a response function that includes a graph filter that can be applied to a graph data structure generated from the data points in the point cloud. The graph filter can be a function that takes a graph data structure as input as an input and produces an output that is indexed by the same graph data. The graph data structure can be an adjacency matrix that indicates the relationships between different nodes (e.g., point cloud data points) in a graph. The adjacency matrix can be a square matrix having values that correspond to the edge weights between the nodes in the graph.

To generate the graph data structure, the processing circuitry 212 can generate an adjacency matrix with edge weights W such that:

$$W_{i,j} = e^{-\|x_i - x_j\|_2^2 / \sigma^2},$$

where W can be an adjacency matrix between points in the point cloud, $x_i$ and $x_j$ can correspond to the ith and jth data points in the point cloud respectively, and sigma is a tunable parameter to the graph filter response function. In some implementations, the processing circuitry 212 can generate the adjacency matrix such that the edge weights for a data point are set to zero if the distance between the points joined by the edge is greater than a predetermined threshold. Using the above adjacency matrix, the processing circuitry 212 can utilize a graph filter function:

$$h(A) = I - A,$$

where h(A) is the graph filter and A is a graph shift operator such that:

$$A = D^{-1} W,$$

where W is the adjacency matrix outlined above and D is a diagonal matrix where $D_{i,j}$ can be the sum of every element in the ith row of W. Using the graph filter described above, the processing circuitry 212 can define the response function as:

$$f_i(X) = \|(h(A)X)_i\|_2^2$$

The response function can operate over the entire set of data points X, and assign to each of the data points X a weight value that indicates the likelihood that the respective point is a part of a contour.

To improve computational efficiency, the processing circuitry 212 can generate a k-dimensional binary tree (sometimes referred to herein as a "k-d tree") using the set of data points to generate the adjacency matrix W. In some implementations, the processing circuitry 212 does not create a k-d tree, and instead generates the adjacency matrix to include non-zero edges from each of the data points in the point cloud to each of the other data points in the point cloud.

The processing circuitry 212 can generate the k-dimensional tree using the point cloud data points as a binary tree that sorts the point cloud data points into nodes based on parameters of the point cloud data points such as spatial coordinates, and can be further generated using intensity, brightness, color, density, or other parameters assigned to each point cloud data point. The adjacency matrix W for a particular point cloud data point can be generated based on the k-dimensional tree such that the weight $W_{i,j}$ is set to zero for each point cloud data point more than k neighbors away in the k-dimensional tree from the particular point cloud data point. The number of dimensions of k can correspond to the number of different parameters used to generate the k-dimensional tree (e.g., three spatial coordinate dimensions or three color dimensions, etc.). The number of dimensions k can be a predetermined parameter, which can be used to control the computational demand associated with generating the response function and applying the response function to the point cloud data points.

In some implementations, when assembling the adjacency matrix, the processing circuitry 212 can determine the Euclidian distance based on at least one color channel of the pair of data points of the set of data points (e.g., rather than determining $x_i$-$x_j$ based solely on position data that is independent of any color channel data. In some implementations, the processing circuitry 212 can calculate a Euclidean distance based additionally on the red, green, or blue color channel data (or the cyan, yellow, magenta, intensity color channel data, as the case can be) included in each data point. For example, the processing circuitry 212 can determine or calculate the Euclidean distance using each of the color channels as three additional and independent distances that can range, for example, from 0 to 1. The color values can be stored as a part of or in association with data point, for example, as 8-bit color data (one 8-bit number for each color channel) ranging from 0 to 255.

Generating the graph filter can include identifying an intensity parameter of the set of data points. The intensity parameter can be, for example, a parameter that describes a channel that is included in or calculated from the color values in the data points of the point cloud. For example, if the data points store CYMK color channels, the data points can utilize the K as the intensity value for a data point. In some implementations, such when the data points are stored with an RGB color channel, the processing circuitry 212 can calculate a weighted average of the color channels in each data point to compute an intensity value for each data point. The processing circuitry 212 can compare the intensity values generated or accessed for the data points in the point cloud, and determine whether the variation between a significant number (e.g., greater than 10%, 15%, 40%, 50%, any other predetermined amount, etc.) of the intensity values is greater than a predetermined threshold. If this variation is greater than a predetermined threshold, the surface represented by the point cloud can not be illuminated evenly, and the processing circuitry 212 can use the non-color based graph filter variant. In contrast, if the variation is not greater than the predetermined threshold, the surface can be evenly and clearly illuminated, and the processing circuitry 212 can utilize the color-based graph filter variant.

The processing circuitry 212 can select a subset of the set of data points using a selection policy and the set of response values corresponding to each of the data points in the point cloud. The selection policy can indicate, for example, which points are relevant for further processing operations, and which can be removed from the overall point cloud without sacrificing image registration accuracy. The selection policy executed by the processing circuitry 212 can, for example, compare the response values of each of the data points to a predetermined threshold. If the response value is equal to or greater than the predetermined threshold, the selection policy can indicate that the data point should not be culled from the point cloud. If the response value is less than the predetermined threshold, the selection policy can indicate that the point should be removed, or down-sampled, from the point cloud. Accordingly, the selection policy can be configured to select the subset of data points in the point cloud that sufficiently correspond to one or more contours on the surface of the object represented by the point cloud.

In some implementations, the selection policy can remove points on pseudo-random basis. In addition to removing data points based on the calculated response values, the processing circuitry 212 can further improve performance by uniformly removing data points from the point clouds. For example, to pseudo-randomly and uniformly remove data points from the entire point cloud, the selection policy can include instructions to generate a pseudo random number for each data point in the point cloud. The pseudo-random number can be a value between a range of values, such as between 0 and 100. The processing circuitry 212 can determine whether the pseudo-random value for a data point is less than a predetermined threshold. Following the previous example, if the selection policy indicates that about 25% of the data points should be uniformly culled from the point cloud, the selection policy can include instructions to remove or cull data points that are assigned a pseudo-random value that is less than 25.

Once the selection policy has indicated which points can be removed from the point cloud without sacrificing the accuracy of the system, the processing circuitry 212 can generate a data structure including the selected subset of the set of data points that were not culled by the selection policy. The data structure can be smaller than the data structure that includes the entire set of the data points in the point cloud. In some implementations, the data points in the subset can be assigned an index value that corresponds to a respective position of the data point in the data structure. The processing circuitry 212 can then store the generated data structure of the subject of the data points in the memory of the processing circuitry 212.

Figure 8:
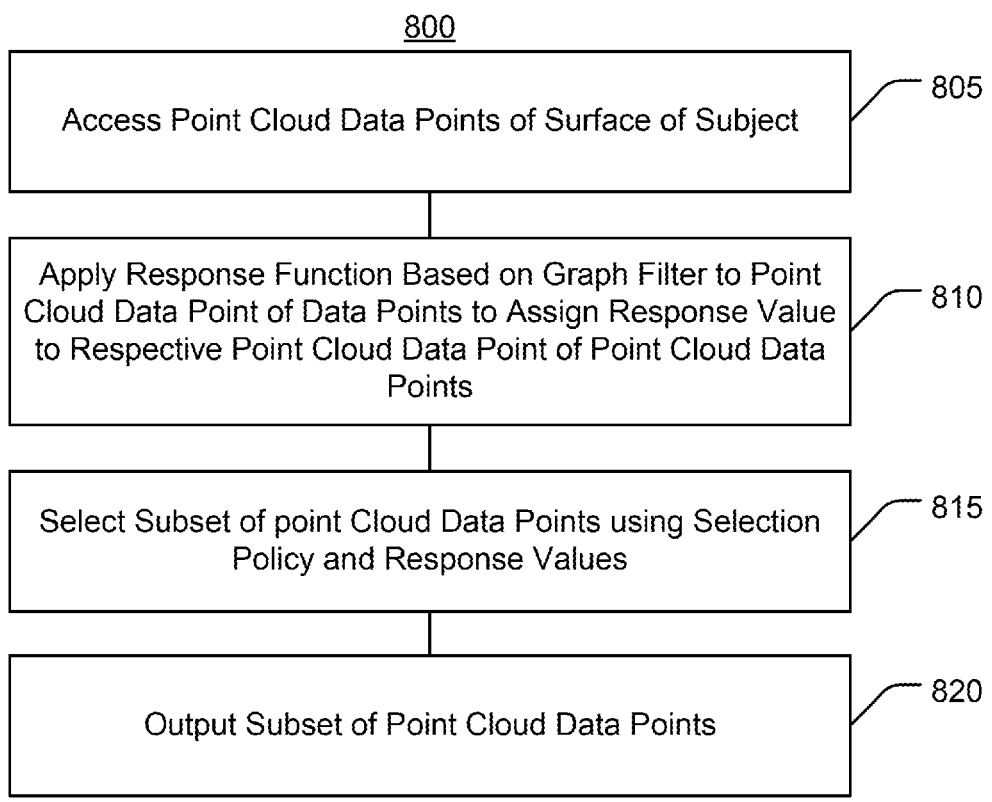
FIG. 8 is a flow diagram of a method for down-sampling a point cloud generated from a 3D surface model for improved image alignment efficiency according to an embodiment of the present disclosure.

FIG. 8 depicts a method 800 for down-sampling a point cloud generated from a 3D surface model for improved image alignment efficiency. The method 800 can be performed using various devices and systems described herein, such as the image processing system 100. The method 800 can be used to perform contour-based resampling of point cloud data, which can decrease the density of the point cloud of the point cloud data while retaining relevant points and relationships between points, such as contours and edges.

At 805, a plurality of point cloud data points is accessed. The point cloud data points can correspond to a surface of a subject. For example, the point cloud data points can correspond to medical images or 3D images of the subject detected by 3D cameras, MRI devices, or CT devices.

At 810, a response function based on a graph filter is applied to each point cloud data point of the plurality of data points. The response function can be applied to assign a response value to each respective point cloud data point of the plurality of point cloud data points.

For example, the graph filter can be a function $h(A)=I-A$, where A is a graph shift operator $A=D^{-1}W$. W can be an adjacency matrix for the point cloud data points, such that W has edge weights $W_{i,j}=e^{-\|x_i-x_j\|_2^2/\sigma^2}$, and D is a diagonal matrix where $D_{i,i}$ is a sum of every element in the ith row of W. The response function can be defined as $f_i(X)=\|(h(A)X)_i\|_2^2$.

In some embodiments, the graph filter is generated using a k-dimensional tree, which can reduce computational requirements. For example, the k-dimensional tree can be generated using the point cloud data points as a binary tree that sorts the point cloud data points into nodes based on parameters of the point cloud data points such as spatial coordinates, and can be further generated using intensity, brightness, color, density, or other parameters assigned to each point cloud data point. The adjacency matrix W for a particular point cloud data point can be generated based on the k-dimensional tree such that the weight is set to zero for each point cloud data point more than k neighbors away in the k-dimensional tree from the particular point cloud data point. The number of dimensions k can correspond to the number of different parameters used to generate the k-dimensional tree (e.g., three spatial coordinate dimensions or three color dimensions). The number of dimensions k can be a predetermined parameter, which can be used to control the computational demand associated with generating the response function and applying the response function to the point cloud data points. The parameter $\sigma^2$ can also be a predetermined parameter. The response function can be applied to each of the point cloud data points to generate a response value corresponding to each respective point cloud data points.

At 815, a subset of the plurality of point cloud data points is selected. The subset can be selected using a selection policy and the plurality of response values. For example, the subset can be selected based on the response values. The selection policy can perform weighted selection, in which each point is selected for the subset based on the response value assigned to the point (e.g., based on the response value meeting a threshold). In some embodiments, the selection policy performs random weighted selection, such as by randomly generating one or more thresholds to compare the response values to.

At 820, the subset of the plurality of point cloud data points is outputted. The subset can be outputted for further image processing operations such as feature matching and point cloud alignment, which can be improved due to the reduced density of the subset of point cloud data points. FIG. 14 depicts an example of an image 1400 which has been resampled in accordance with the present solution with k=10 and $\sigma^2$=0.0005, resulting in 19.31% of points retained at 1405 and 5.30% of points retained at 1410. As illustrated in FIG. 13, the present solution can reduce the density of point cloud data points by approximately four to twenty times while retaining relevant features such as edges and contours of the subject.

As described above, the distance between point cloud data points $x_i$ and $x_j$ used to determine the edge weights of the adjacency matrix W can be a Euclidean distance (e.g., $L^2$ norm for determining $x_i$-$x_j$) based on spatial coordinates of the point cloud data points. As such, color data is not used to generate the adjacency matrix W. In some embodiments, the distance between the point cloud data points $x_i$ and $x_j$ can be determined further based on color data from one or more color channels assigned to the point cloud data points (e.g., in addition to spatial coordinates). For example, one or more color data values from one or more respective color channels (e.g., red, green, blue channels) can be used as additional dimensions in addition to spatial dimensions when determining the Euclidean distance between point cloud data points. The color data can be normalized to a particular scale (e.g., to a scale from 0 to 1), which can be a same scale as for which the spatial dimensions are compared, or can be a different scale so that different weightings are applied to spatial distances and color distances.

Using color data (e.g., to perform a color-aware filter) can be effective in various situations, though it can increase the computational complexity of resampling the point cloud data points. For example, text (e.g., colored text) can be sampled more frequently when using color data, as the text can otherwise be detected as forming part of the plane where the text is located rather than forming edges or contours of the subject. In addition, the color data captured by the image capture devices that is used to generate the point cloud data can depend significantly on the lighting present when the image data was captured. As such, factors such as illumination, shadows, and occlusion can affect the effectiveness of using the color data. When the point clouds that are being resampled for downstream comparison have similar or even illumination, using the color data can improve transformation estimation. Using the color data can also mitigate issues with the image capture devices such as flying pixels (which can take on the same color as pixels at the edge of the subject).

In some embodiments, the response function can be applied in a first mode of operation that uses the color data or a second mode of operation that does not use the color data. The mode of operation can be selected based on information from the image data, such as an intensity parameter of the point cloud data points. For example, if the intensity parameter indicates that illumination of the point cloud data points is greater than a threshold measure of evenness (e.g., based on statistical measures of the intensity such as median, average, or standard deviation of intensity), then the first mode of operation can be selected.

In some embodiments, one or more preliminary filters are applied to the point cloud data points prior to resampling using the response function and graph filter. For example, a voxel-grid filter can be applied to the point cloud data points, and the response function can be applied to an output of the voxel-grid filter, which can improve the overall effectiveness of the resampling. Applying the voxel-grid filter can include generating a grid (e.g., 3D grid with each voxel operating as a bin for particular spatial coordinates) with side length 1 over the point cloud data points, assigning each point cloud data point to respective voxels based on the spatial coordinates of the point cloud data points, and then generating an updated point cloud data point at the centroid position and centroid color of each point cloud data point assigned to each respective voxel. The voxel-grid filter can allow for uniform density of point cloud data points (e.g., as compared to decreasing density as distance from the camera increases due to how the camera detects image data which can be retained in some random resampling methods) as well as smoothing out local noise variations.

VI. Systems and Methods for Detecting Contour Points from a Down-Sampled Point Cloud and Prioritizing Analysis of the Contour Points Features of the resampled point cloud, such as contour points, can be identified in order to perform further image processing operations. For example, identifying features can allow for feature matching and alignment of point clouds based on the feature matching. Effective selection of features (e.g., to preserve physically relevant features) can reduce the computational requirements for performing alignment while maintaining target performance and quality of alignment. In some embodiments, features are selected using key point detection methods such as scale invariant feature transform (SIFT) or speeded up robust features (SURF) algorithms.

Figure 9:
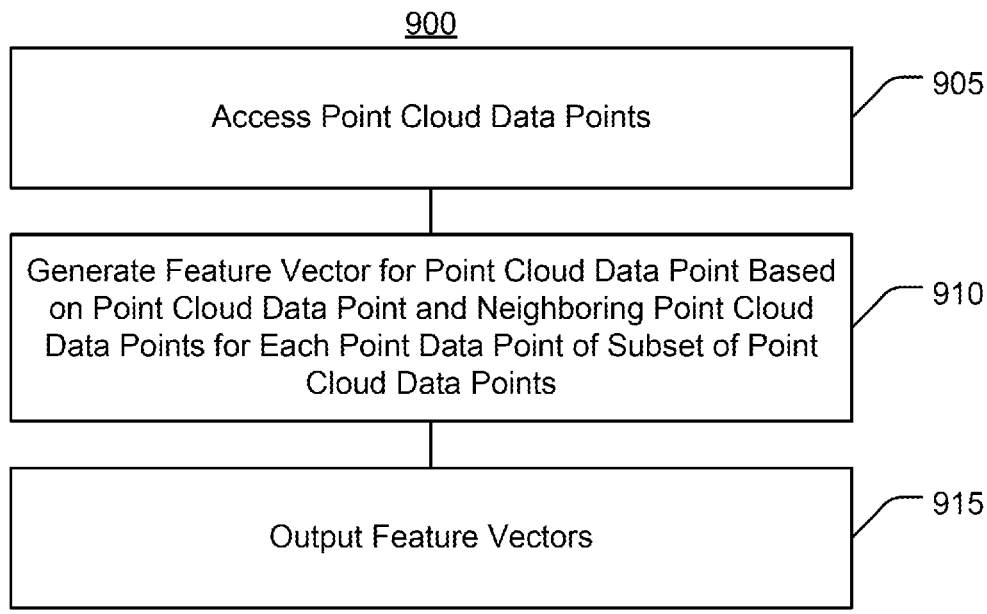
FIG. 9 is a flow diagram of a method for detecting contour points from a down-sampled point cloud and prioritizing analysis of the contour points according to an embodiment of the present disclosure.

FIG. 9 depicts a method 900 for detecting contour points from a down-sampled point cloud and prioritizing analysis of the contour points. The method 900 can be performed using various devices and systems described herein, such as the image processing system 100. In particular, the processing circuitry 212 can perform any of the operations described herein.

At 905, a plurality of point cloud data points is accessed. The point cloud data points can correspond to a surface of a subject. For example, the point cloud data points can correspond to medical images or 3D images of the subject detected by 3D cameras, MRI devices, or CT devices.

At 910, a feature vector for the point cloud data point is generated. The feature vector for the point cloud data point can be generated for each point cloud data point of at least a subset of the plurality of point cloud data points. The feature vector for the point cloud data point can be based on the point cloud data point and a plurality of neighboring point cloud data points.

In some embodiments, the feature vector is generated by assigning a plurality of rotational values between the point cloud data point and the plurality of neighboring point cloud data points to each of a plurality of spatial bins representing the feature vector. For example, the feature vector can be generated using fast point feature histograms (FPFH). Rotational values on each spatial axis (e.g., theta, phi, and alpha angles) can be determined for each of the spatial bins. Each spatial bin can have neighboring point cloud data points assigned that are within a given radius of the point cloud data point; for example, eleven spatial bins can be used, resulting in a vector of length 33 (eleven spatial bins each assigned three rotation angles). Generating the feature vector can be on the order of $O(n*k^2)$, where n is the number of point cloud data points and k is the number of neighbors within the radius of the point cloud data point.

In some embodiments, the feature vector is generated by determining a reference frame for the point cloud data point using neighboring point cloud data points within a predetermined radius of the point cloud data point, and generating the feature vector based on the reference frame and a plurality of spatial bins. For example, the feature vector can be generated using signature of histogram orientations (SHOT). The reference frame can be a 9-dimensional reference frame determining using the neighboring point cloud data points. A grid (e.g., isotropic grid) can be generated to identify the plurality of spatial bins, such as a grid with 32 bins and 10 angles assigned to each bin, which can result in a feature vector of length 329 (320 dimensions to describe the bins and 9 dimensions for the reference frame). In some embodiments, the feature vector includes color data, which can be assigned to additional bins. Generating the feature vector can be on the order of $O(n*k)$.

The process to be performed to generate the feature vector can be selected based on factors such as accuracy and computational time. For example, generating the feature vector using the reference frame can have reduced computational time with similar performance in terms of accuracy and fidelity in retaining relevant information regarding the subject. As described above with respect to resampling, the use of color data can be affected by the evenness of illumination the environment, and thus the feature vector generation can be performed in various modes of operation that can or can not use color data responsive to the illumination. For example, using color data can be useful when operating in a scene registration mode in which point cloud data is registered to the scene (e.g., medical scan data registered to 3D image data of the subject).

At 915, each feature vector is outputted. For example, feature vectors can be outputted to perform feature matching, which can be improved in computational efficiency due to the manner in which the present solution generates the feature vectors. The feature vectors can be stored in one or more data structures in a memory, such as the memory of the processing circuitry 212.

VII. Systems and Methods for Dynamically Allocating Processing Resources in a Parallel Processing Environment for Image Alignment and Point Cloud Generation Operations The image processing pipeline described herein can use parallel processing operations to improve computational time for image alignment and point cloud generation. For example, the processing circuitry 212 can allocate processing resources such as separate threads, separate processing cores, or separate virtual machines (e.g., as controlled by a hypervisor), and can be used to perform parallel processes such as point cloud resampling and feature vector determination (e.g., resampling two different point clouds in parallel or generating feature vectors from the resampled point clouds in parallel). The processing circuitry 212 can include other computing devices or computing machinery, such as graphics processing units, field-programmable gate arrays, computing clusters having multiple processors or computing nodes, or other parallel processing apparatuses. Based on the current demand of the processing resources and on processing job size, the processing circuitry 212 can dynamically allocate certain processing jobs to processing machinery that specializes in parallel processing, and other processing jobs to processing machinery that specializes in sequential processing.

In some implementations, the parallel processing operations can be performed based on a type of the image data or image stream capture source. For example, DICOM data (e.g., CT data, MRI data) can have particular features that are different than 3D image data detected by a depth camera. The present solution can assign different processing threads to each point cloud received from each source, and can allocate greater or fewer processing resources to different image source modalities based on an expected computational demand in order to maintain synchronization between processes performed on each modality. Performing the point cloud computations in a tightly scheduled manner across parallel and sequential computing devices, as appropriate, allows the processing circuitry 212 to perform accurate image registration in real-time.

Figure 15:
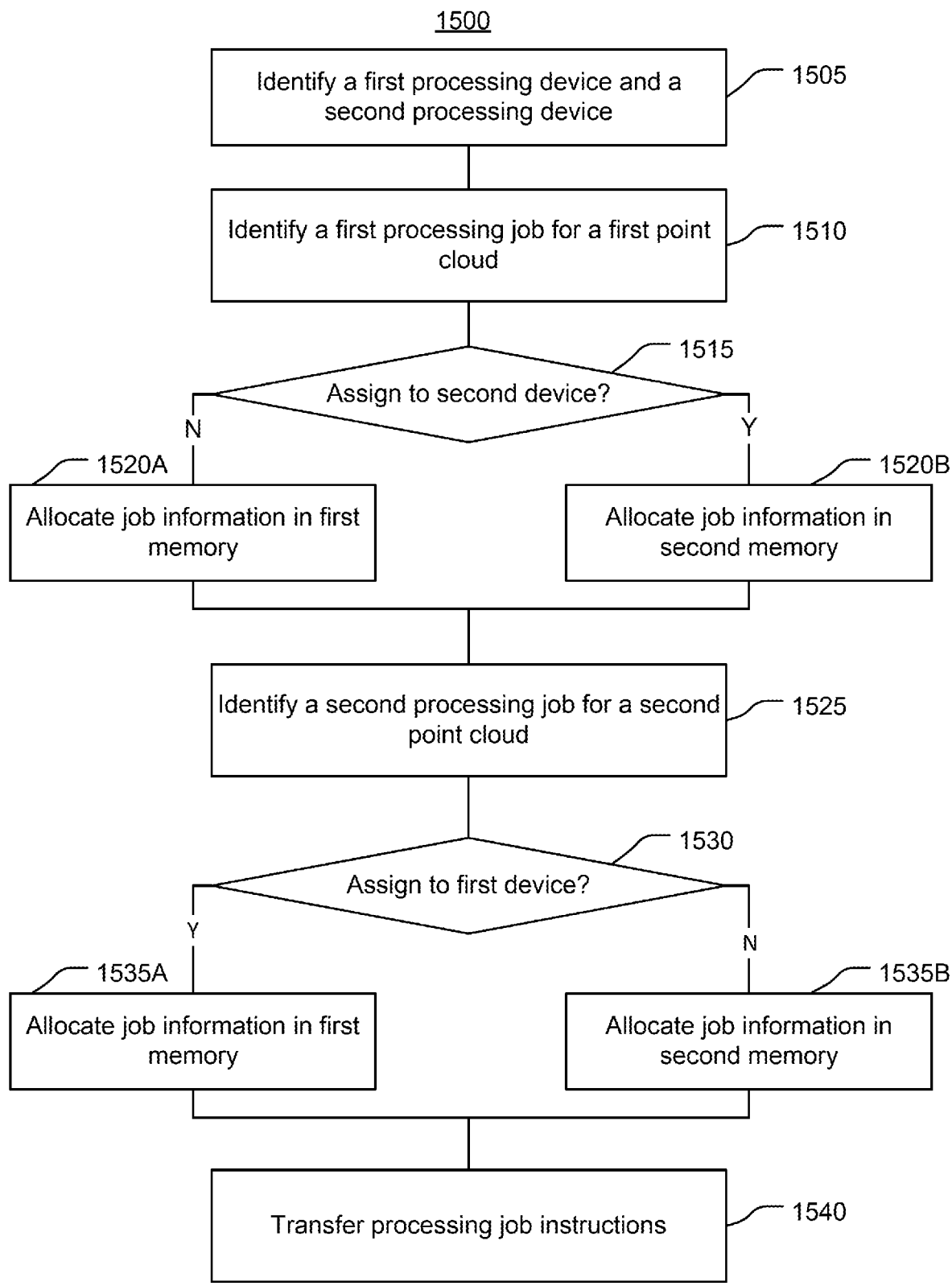
FIG. 15 is a flow diagram of a method for dynamically allocating processing resources to different computational objects within processing circuitry, according an embodiment of the present disclosure.

Referring now to FIG. 15, depicted is an illustrative flow diagram of a method 1500 for allocating processing resources to different computing machinery to improve computational performance of point cloud registration operations. The method 1500 can be executed, performed, or otherwise carried out by the image processing system 100, in particular at least the processing circuitry 212, the computer system 1300 described herein in conjunction with FIGS. 13A and 13B, or any other computing devices described herein.

At 1505, the processing circuitry 212 can identify a first processing device having a first memory and a second multi-processor device having a second memory. The processing circuitry 212 can include different processing machinery, such as processing machinery that specializes in parallel operations (e.g., clusters of computing nodes, graphics processing units (GPUs), field-programmable gate arrays (FPGA), etc.), and computing machinery that specializes in sequential operations (e.g., high frequency single-core or multi-core devices, etc.). Each of these devices can include memory banks or computer readable memory for processing operations. In some implementations, the memory banks or other computer readable media can be shared between different processing devices. In addition, memory for some processing devices can be higher-bandwidth than for other processing devices.

In some implementations, the processing circuitry 212 of the image processing system 100 can be modular. For example, certain processing devices and memory can be added or removed from the system via one or more system buses or communication buses. The communication busses can include PCI Express and Ethernet, among others. Further discussion of different system buses and their operation can be found below in conjunction with FIGS. 13A and 13B. The processing circuitry 212 can query one or more communications or system buses to identify and enumerate the available processing resources to process point cloud data. For example, the processing circuitry 212 can identify one or more parallel processing units (e.g., clusters of computing nodes, GPUs, FPGAs, etc.) or sequential processing units (e.g., high frequency single-core or multi-core devices, etc.). Once the devices are identified, the processing circuitry 212 can communicate with each processing device to determine parameters and memory banks, maps, or regions associated with each device. The parameters can include processing capabilities, cores, memory maps, configuration information, and other information related to processing.

At 1510, the processing circuitry 212 can identify a first processing job for a first point cloud. After the processing devices of the processing circuitry 212 have been identified, the processing circuitry 212 can begin to perform the processing tasks that are detailed herein. The processing circuitry 212 can execute instructions to process point cloud information for image capture devices 104, combined point clouds (e.g., global scene point clouds), or points associated with 3D image data. For example, one such processing job is computing the k-dimensional tree for a point cloud, as described herein above. Other processing jobs that can be identified by the processing circuitry 212 can include graph filter generation, calculating Euclidian distance, determining an overall intensity value, down-sampling point clouds, calculating normal maps, generating features for point clouds, translating 3D medical image data (e.g., segmentations) into a 3D image that can be represented as a point cloud, among others. In some implementations, the jobs or operations described herein have a particular order that the processing circuitry 212 can identify.

The processing jobs identified by the processing circuitry 212 can include job information, such as metadata about information that is to be processed by the processing circuitry 212. The job information can also include one or more data structures or regions of computer memory that contain the information that is to be processed when the job is executed. In some implementations, the job information can include pointers to the regions of memory that include that information to be processed when the job is executed. Other job information identified by the processing circuitry 212 can include instructions, that when executed by the identified processing devices, can cause the processing devices to perform the computational tasks on the information to be processed to carry out the processing job. In some implementations, the first processing job can be identified in response to receiving point cloud data from at least one image processing device 104.

At 1515, the processing circuitry 212 can determine to assign the first processing job to the second multi-processor device. Certain processing jobs can be performed more quickly on different, more capable processing hardware. For example, if a processing job includes operations for feature detection in a point cloud, which includes many operations that can be performed in parallel, the processing circuitry 212 can determine to perform the processing job on a parallel computing device. A processing device(s) can be selected for a particular job based on the information about the job that is to be performed. Such information can include a number of data points in a point cloud that is processed by the job, a utilization amount of the processing devices that are part of the processing circuitry 212, or the overall processing complexity of the job.

If the number of points that are processed in a particular job exceeds a threshold, and the processing job is a not a sequentially based algorithm, the processing circuitry 212 can process determine to process the job on a multi-processor device such as a GPU, a cluster, or an FPGA, if any of these devices are present. Otherwise, if the number of points to be processed is below a predetermined threshold, such as when the point cloud is of a 3D medical image (e.g., much smaller, or fewer points, etc.) the processing circuitry 212 can determine to process the job on a processing device that specializes in sequential processing. In another example, if one of the processing devices is over utilized (e.g., the utilization amount is greater than a predetermined threshold, etc.) the processing circuitry 212 can determine to assign the job to a different computing device. In contrast, if the processing circuitry 212 determines that a processing unit is underutilized (e.g., the utilization amount is greater than or less than a predetermined threshold respectively, etc.), and it is suited to perform the processing job in a reasonable amount of time, the processing circuitry can determine to assign the processing job to that processing device. If the processing complexity of a job is greater than a certain threshold (e.g., a very high computational order, etc.), the processing circuitry 212 can assign the job to a computing device that is appropriate for the complexity, such as a multi-processor device. If the processing circuitry 212 determines that a processing job should be performed on a processing device that specializes in sequential computing operations, the processing device can perform STEP 1520A. If the processing circuitry 212 determines that a processing job should be performed on a second multi-processor device that specializes in parallel computing operations, the processing device can perform STEP 1520B.

At 1520A and 1520B, the processing circuitry 212 can allocate the information for the first processing job including first point cloud to the second memory or the first memory. Once a processing device has been determined for a particular job, the processing circuitry 212 can allocate the job specific resources to carry out the job to the appropriate processing device. If the processing circuitry 212 determines that a job will be performed using one or more parallel processing devices, the processing circuitry 212 can transmit or otherwise allocate the job specific data, such as the point clouds or any other relevant data structures, to the memory of the parallel processing device. If the job specific resources are resident in memory at a location that is shared with the parallel processing device, the processing circuitry 212 can provide a pointer to the location of the job relevant data to the processing device. Otherwise, the processing circuitry 212 can transmit or otherwise copy (e.g., via direct memory access (DMA), etc.) the processing specific data into the memory of the parallel processing device to prepare the job for execution. The processing circuitry 212 can use one or more application programming interfaces (APIs), such as NVIDIA CUDA or OpenMP, to communicate with any number of parallel processing devices or resources, or perform any of the operations disclosed herein.

If the processing circuitry 212 determines that a job will be performed using a sequential processing device, the processing circuitry 212 can transmit or otherwise allocate the job specific data, such as the point clouds or any other relevant data structures, to the memory of the sequential processing device. If the job specific resources are resident in memory at a location that is shared with the parallel processing device, the processing circuitry 212 can provide a pointer to the location of the job relevant data to the processing device. Otherwise, the processing circuitry 212 can transmit or otherwise copy (e.g., via direct memory access (DMA), etc.) the processing specific data into the memory of the sequential processing device to prepare the job for execution. The processing circuitry 212 can use one or more application programming interfaces (APIs), such as OpenMP, to communicate with any number of sequential processing devices or resources, or perform any of the operations disclosed herein.

At 1525, the processing circuitry 212 can identify a second processing job for a second point cloud. Even while another job is being allocated or executed by other computing devices, the processing circuitry 212 can execute instructions to process point cloud information for image capture devices 104, combined point clouds (e.g., global scene point clouds), or points associated with 3D image data, and allocate these jobs to other computing devices. For example, one such processing job is computing the k-dimensional tree for a point cloud, as described herein above. Other processing jobs that can be identified by the processing circuitry 212 can include graph filter generation, calculating Euclidian distance, determining an overall intensity value, downsampling point clouds, calculating normal maps, generating features for point clouds, translating 3D medical image data (e.g., segmentations) into a 3D image that can be represented as a point cloud, or any of the other processing operations described herein. In some implementations, the jobs or operations described herein have a particular order that the processing circuitry 212 can identify. In some implementations, the processing circuitry 212 can stall processing of a job if a previous job on which the current job depends is still being processed by the computing machinery of the processing circuitry 212.

The processing jobs identified by the processing circuitry 212 can include job information, such as metadata about information that is to be processed by the processing circuitry 212. The job information can also include one or more data structures or regions of computer memory that contain the information that is to be processed when the job is executed. In some implementations, the job information can include pointers to the regions of memory that include that information to be processed when the job is executed. Other job information identified by the processing circuitry 212 can include instructions, that when executed by the identified processing devices, can cause the processing devices to perform the computational tasks on the information to be processed to carry out the processing job. In some implementations, the processing job can be identified in response to receiving point cloud data from at least one image processing device 104, or identified in response to another job being completed.

At 1530, the processing circuitry 212 can determine to assign the second processing job to the first processing device. If the identified processing job has a high order of complexity and does not have many operations that can be performed in parallel, then the processing circuitry 212 can determine to assign the processing job to a sequential computing device with a high clock frequency. This determination can also be made based on the information about the job that is to be performed. Such information can include a number of data points in a point cloud that is processed by the job, a utilization amount of the processing devices that are part of the processing circuitry 212, or the overall processing complexity of the job. In some implementations, jobs can be assigned to certain computing devices based on a priority value. For example, a job with a high priority value for a sequential computing device will be assigned to a sequential computing device before being assigned to a non-sequential computing device.

If the number of points that are processed in a particular job exceeds a threshold, and the processing job is a not a sequentially based algorithm, the processing circuitry 212 can process determine to process the job on a multi-processor device such as a GPU, a cluster, or an FPGA, if any of these devices are present. Otherwise, if the number of points to be processed is below a predetermined threshold, such as when the point cloud is of a 3D medical image (e.g., much smaller, or fewer points, etc.) the processing circuitry 212 can determine to process the job on a processing device that specializes in sequential processing. In another example, if one of the processing devices is over utilized (e.g., the utilization amount is greater than a predetermined threshold, etc.) the processing circuitry 212 can determine to assign the job to a different computing device. In contrast, if the processing circuitry 212 determines that a processing unit is underutilized (e.g., the utilization amount is greater than or less than a predetermined threshold respectively, etc.), and it is suited to perform the processing job in a reasonable amount of time, the processing circuitry can determine to assign the processing job to that processing device. If the processing complexity of a job is greater than a certain threshold (e.g., a very high computational order, etc.), the processing circuitry 212 can assign the job to a computing device that is appropriate for the complexity, such as a multi-processor device. Further, if a particular algorithm or process includes a majority of operations that cannot be performed in parallel, the processing circuitry 212 can assign the job to a sequential processing device. If the processing circuitry 212 determines that a processing job should be performed on a processing device that specializes in sequential computing operations, the processing device can perform STEP 1535A. If the processing circuitry 212 determines that a processing job should be performed on a second multi-processor device that specializes in parallel computing operations, the processing device can perform STEP 1535B At 1535A and 1535B, the processing circuitry 212 can allocate the information for the second processing job to the first memory or the second memory (STEPS 1535A and 1535B). Once a processing device has been determined for a particular job, the processing circuitry 212 can allocate the job specific resources to carry out the job to the appropriate processing device. If the processing circuitry 212 determines that a job will be performed using a sequential processing device, the processing circuitry 212 can transmit or otherwise allocate the job specific data, such as the point clouds or any other relevant data structures, to the memory of the sequential processing device. If the job specific resources are resident in memory at a location that is shared with the parallel processing device, the processing circuitry 212 can provide a pointer to the location of the job relevant data to the processing device. Otherwise, the processing circuitry 212 can transmit or otherwise copy (e.g., via direct memory access (DMA), etc.) the processing specific data into the memory of the sequential processing device to prepare the job for execution. The processing circuitry 212 can use one or more application programming interfaces (APIs), such as OpenMP, to communicate with any number of sequential processing devices or resources, or perform any of the operations disclosed herein.

If the processing circuitry 212 determines that a job will be performed using one or more parallel processing devices, the processing circuitry 212 can transmit or otherwise allocate the job specific data, such as the point clouds or any other relevant data structures, to the memory of the parallel processing device. If the job specific resources are resident in memory at a location that is shared with the parallel processing device, the processing circuitry 212 can provide a pointer to the location of the job relevant data to the processing device. Otherwise, the processing circuitry 212 can transmit or otherwise copy (e.g., via direct memory access (DMA), etc.) the processing specific data into the memory of the parallel processing device to prepare the job for execution. The processing circuitry 212 can use one or more application programming interfaces (APIs), such as NVIDIA CUDA or OpenMP, to communicate with any number of parallel processing devices or resources, or perform any of the operations disclosed herein.

At 1540, the processing circuitry 212 can transfer instructions to cause the first processing device and the second multi-processing device to perform their assigned processing jobs. To allow the appropriate processing devices to carry out the processing of a particular job, the processing circuitry 212 can transfer (e.g., via one or more system buses or communication buses, etc.) instructions associated with each job to the appropriate computing device. In some implementations, the instructions transmitted to the computing devices can include device specific instructions. For example, if a GPU device is selected for a processing job, the processing circuitry 212 can identify and transmit GPU specific instructions (e.g., CUDA instructions, etc.) to execute the job. Likewise, if a standard CPU device (e.g., a sequential processing device, etc.) is chosen, the processing circuitry 212 can identify and transmit CPU specific instructions to carry out the processing job. The processing instructions for each computing device can be included in the job information identified by the processing circuitry 212. One the processing job is complete on a particular processing device, the processing circuitry 212 can identify a signal from that device that indicates that the job is complete. The processing circuitry 212 can then identify a region of memory that includes the results of the computations carried out as part of the processing job, and copy it to another region of working memory for further processing.

VIII. Systems and Methods for Registering a Point Cloud of a Medical Image to a Global Scene Point Cloud Once the images 208 captured from the image capture devices 104 have been down-sampled to improve computational efficiency and feature vectors have been extracted from the point clouds, the processing system can register a 3D medical image, such as a CT scan image or a 3D model generated from an MIll image to the point cloud. Registering the CT scan image with the point cloud in real-time can allow medical professionals to more easily align surgical instruments with features indicated in the medical image because the medical image is rendered in the same reference frame as the real-time subject information. Further, the reference frame data can be used in conjunction with position information from surgical instruments. The tracking information can be transformed into the same reference frame as the point cloud data of the subject and the transformed medical image to improve precise application of surgical treatments.

Referring back to FIGS. 1 and 2, the processing circuitry 212 of the image processing system 100 can register a point cloud from one or more image capture devices 104 with a 3D medical image of a subject. The 3D medical image can be, for example a CT scan image or a 3D model generated from an MIll image. To improve the processing speed of the registration process, the processing circuitry 212 can be used to identify feature vectors of the medical image in an offline process. Thus, when the medical image is registered with the point cloud, the processing circuitry 212 only needs to compute the feature vectors of the point cloud that is captured in real-time, thus improving overall system performance.

The processing circuitry 212 can access a set of data points of a first point cloud representing a global scene having a first reference frame. The global scene can be, for example, a scene that is represented by the set of data points in the point cloud. For example, when capturing an image using a 3D camera, such as an image capture device 104, features other than the subject under analysis, such as the surrounding area or room in which the subject is situated, can be captured. Thus, the point cloud can not solely represent the surface of an area of interest, such as a subject, but can also include surfaces of an environment, which can be less relevant to the image registration process. The global scene point cloud can be the combined point cloud generated from the image capture devices 104 as described herein above.

The processing circuitry 212 can identify a set of feature data points of features of a 3D medical image having a second reference frame different from the first reference frame. The feature data points can be, for example, one or more feature vectors extracted from the 3D medical image in acquired in an offline process. The features vectors can be generated, for example, by the processing circuitry 212 by performing one or more steps of the method 900 described herein above in conjunction with FIG. 9. Accessing the feature vectors of the 3D medical image can include retrieving the feature vectors from one or more data structures in the memory of the processing circuitry 212.

In some implementations, prior to determining the features vectors present in the 3D medical image, the processing circuitry 212 can down-sample the point cloud generated from the 3D medical image in accordance with the aspects described herein above. For example, the processing circuitry 212 can extract one or more data points from the 3D medical image to generate a point cloud that is representative of the 3D medical image. The point cloud extracted from the 3D medical image can have a frame of reference different from those of the point clouds generated by the image capture devices 104. In some implementations, the point cloud captured from the 3D medical image is not down-sampled, and the feature vectors are instead determined based on the entire point of the 3D medical image.

The processing circuitry 212 can determine a transformation data structure for the 3D medical image using the first reference frame, the first set of data points, and the set of feature data points from the feature vectors. In implementations where at least one of the point cloud representing the global scene or the point cloud that represents the 3D medical image has been down-sampled, the processing circuitry 212 can generate the transformation data structure using the reduced, or down-sampled, point cloud(s). The transformation data structure can include one or more transformation matrices. The transformation matrices can be, for example, 4-by-4 rigid transformation matrices. To generate the transformation matrices of the transformation data structure, the processing circuitry 212 can identify one or more feature vectors of the global scene point cloud, for example by performing one or more of the steps of method 900 described herein above in conjunction with FIG. 9. The result of this process can include a set of feature vectors for each point cloud, where the global scene point cloud can be used as a frame of reference (e.g., the points of that cloud will not be transformed). The processing circuitry 212 can generate the transformation matrices such that when each matrix is applied (e.g. used to transform) the point cloud of the medical image, the features of the medical image will align with similar features in the global scene point cloud.

To generate the transformation matrices (e.g., as part of or as the transformation data structure), the processing circuitry 212 can access, or otherwise retrieve from the memory of the processing circuitry 212, the features that correspond to each point cloud. To find points in the reference frame point cloud that correspond to those of a point cloud to be transformed, the processing circuitry can compute an $L^2$ distance between feature vectors in each point cloud. After these correspondences have been enumerated, the processing circuitry 212 can apply a random sample consensus (RANSAC) algorithm to identify and reject false correspondences.

The RANSAC algorithm can be used to determine which correspondences in the features of each point clouds are relevant to the alignment process and which are false correspondences (e.g., features in one point cloud that are falsely identified as corresponding to features in the point cloud to be transformed or aligned). The RANSAC algorithm can be iterative, and can reject the false correspondences between the two point clouds until a satisfactory model is fit. The satisfactory model that is output can identify each of the data points in the reference point cloud that have corresponding data points in the point cloud to be transformed, and vice versa.

In performing the RANSAC algorithm, the processing circuitry 212 can select a sample subset of feature correspondences containing minimal correspondences randomly (e.g. pseudo-randomly, etc.) from the full set of correspondences identified using the $L^2$ distances between feature vectors. The processing circuitry 212 can compute a fitting model and the corresponding model parameters using the elements of this sample subset. The cardinality of the sample subset can be the smallest sufficient to determine the model parameters. The processing circuitry 212 can check which elements of the full set of correspondences are consistent with the model instantiated by the estimated model parameters. A correspondence can be considered as an outlier if it does not fit the fitting model instantiated by the set of estimated model parameters within some error threshold (e.g., 1%, 5%, 10%, etc.) that defines the maximum deviation attributable to the effect of noise. The set of inliers obtained for the fitting model can be called the consensus set of correspondences. The processing circuitry 212 can iteratively repeat the steps of the RANSAC algorithm until the obtained consensus set in certain iteration has enough inliers (e.g., greater than or equal to a predetermined threshold, etc.). The consensus set can then be used in an iterative closest point (ICP) algorithm to determine the transformation data structure.

The processing circuitry 212 can perform the ICP algorithm using the consensus set of corresponding features generated by using the RANSAC algorithm. Each corresponding feature in the consensus set can include one or more data points in each point cloud. When performing the ICP algorithm, the processing circuitry 212 can match the closest point in the reference point cloud (or a selected set) to the point closet point in the point cloud to be transformed. The processing circuitry 212 can then estimate the combination of rotation and translation using a root mean square point to point distance metric minimization technique which will best align each point in the point cloud to be transformed to its match in the reference point cloud. The processing circuitry 212 can transform the points in the point cloud to determine an amount of error in between the features in the point cloud, and iterate using this process to determine an optimal transformation values for position and rotation of the point cloud to be transformed. These output values can be assembled in a transformation matrix, such as a 4-by-4 rigid transformation matrix that includes a change in position or a change in rotation of the 3D medical image. This output transformation matrix can be the transformation data structure.

The transformation matrix for the 3D medical image can correspond to a change in position or a change in rotation of the 3D medical image. To register the 3D medical image with the point cloud representing the global scene, the processing circuitry 212 can applying the change in position or the change in rotation in the transformation matrix to the points in the 3D medical image. By applying the transformation matrix, the 3D medical image is transformed into the same reference frame as the point cloud captured by the image capture devices 104. Thus, the application of the transformation matrix causes the 3D medical image to be aligned with the global scene point cloud. Computing the transformation matrix and the alignment of the 3D medical image can be performed in real-time. In some implementations, the data points of the global scene and the data points of the transformed 3D medical image can be arranged in a single reference frame such that the 3D medical image is positioned relative to the reference frame of the global scene along with the data points of the global scene point cloud.

The processing circuitry 212 can provide display information to the user interface 120 to display, responsive to registering the 3D medical image with the first point cloud, a render of the first point cloud and the 3D medical image. The global scene reference frame, along with the transformed 3D medical image, can be used to generate display data using one or more 3D rendering processes. The display data can be displayed, for example, in the user interface 120 of the image processing system 100.

The image processing system 100 can include information in addition to the transformed 3D image in the reference frame of the global scene point cloud. For example, the processing circuitry 212 can receive tracking data from a surgical instrument, and provide an indication of the surgical instruction in the reference frame of the global scene point cloud. For example, using one of the image capture devices 104 from which the global scene point cloud reference frame is generated, image data (e.g., position, movement, tracking data, etc.) of a surgical instruction can be received. Because the instrument is in the same reference frame as the global scene point cloud, the position and tracking information of the surgical instrument can be displayed along with the global scene point cloud with the transformed 3D medical image.

In some implementations, the processing circuitry 212 can transform the tracking data from the surgical instrument to the first reference frame to generate transformed tracking data. The transformed tracking data can include a shift in position, rotation, or other information received from the surgical instrument. For example, if there is a detected offset between the position of the surgical instrument and the reference frame of the global scene, the processing circuitry 212 can reposition or transform the tracking data to compensate for the offset. The offset can be corrected manually through user input. For example, if a user observing the user interface 120 notices an offset, they can input manual transformation values to transform the tracking data of the surgical instrument to compensate. In some implementations, this process can be performed automatically by the processing circuitry 212. The processing circuitry 212 can then use the transformed tracking data to create display information that renders the transformed surgical instrument tracking information in the global scene reference frame along with the global scene point cloud and the transformed 3D medical image.

Using the information from the global scene, the processing circuitry 212 can determine a location of interest within the first reference frame related to the first point cloud and the 3D medical image. For example, the location of interest can include an area where the 3D medical image can not align properly (e.g., not within an acceptable margin of error, etc.) with the global scene. In certain circumstances, a 3D medical image can be outdated, and not register properly with the global scene. From output values from the ICP process detailed herein above, the processing circuitry can identify certain locations where pairs of the feature correspondences did not align within an acceptable margin of error. If a location of interest is detected, the processing circuitry 212 can generate a highlighted region (e.g., emphasized in some fashion, flashing red, etc.) within the display data rendered in the user interface 120. The highlighted region can correspond to the location of interest on the 3D medical image or the global scene. In some implementations, determining the location of interest can be retrieved from patent data, such as a lesion, broken bone, or other medical issue that can be treated using surgical information. This location can be input by a medical professional, or detected automatically using other processes. The medical professional can input or identify the location, for example, using one or more inputs on the user interface.

In the case of the location of interest being a location that is relevant to a surgical procedure or other medical procedure that can be automated in part by a robotic device, the processing circuitry 212 can generate movement instructions for a surgical instrument or other robotic device based on the global scene point cloud, the 3D medical image, and the location of interest. Using the global scene point cloud data and a tracked location of the surgical instrument, the processing circuitry can identify a path, or series of locations, that do not interfere with (e.g., cause the surgical instrument to collide with the subject in an undesired way, etc.) the global scene point cloud. Because the global scene point cloud can be computed in real-time, and the surgical instrument can be tracked in real-time, the processing circuitry 212 can calculate and provide up-to-date movement instructions to cause the surgical instrument to move to the location of interest within a certain period of time. The movement instructions made include instructions to move the surgical instrument to a particular location, or along a path computed by the processing circuitry 212 that allows the surgical instrument to reach the location of interest without interfering with the patient in an undesired way. After generating the movement instructions, the processing circuitry 212 can use the communications circuitry 216, which can be communicatively coupled to the surgical instrument, to transmit the movement instructions to the surgical instrument. The instructions can be transmitted, for example, in one or more messages or data packets.

The processing circuitry 212 can be configured to determine a distance of a patient represented in the 3D medical image from a capture device responsible at least in part for generating the first point cloud. For example, the processing circuitry 212 can utilize a reference marker or object in the global scene to determine an actual distance between the capture device 104 capturing the global scene point cloud and the subject that is being imaged. If there is a reference object or market in the global scene point cloud that has a known distance or length, the processing circuitry 212 can use the known distance or length to determine or calculate the different dimensions or parameters of the global scene point cloud, such as the distance from the image capture devices 104 to other features in the global scene. Using the features of the subject in the global point cloud that correspond to the features in the 3D medical image, the processing circuitry 212 can determine an average location of the subject. Using this average location and the reference length or distance, the processing circuitry 212 can determine the distance of the subject from the image capture device 104.

Figure 10:
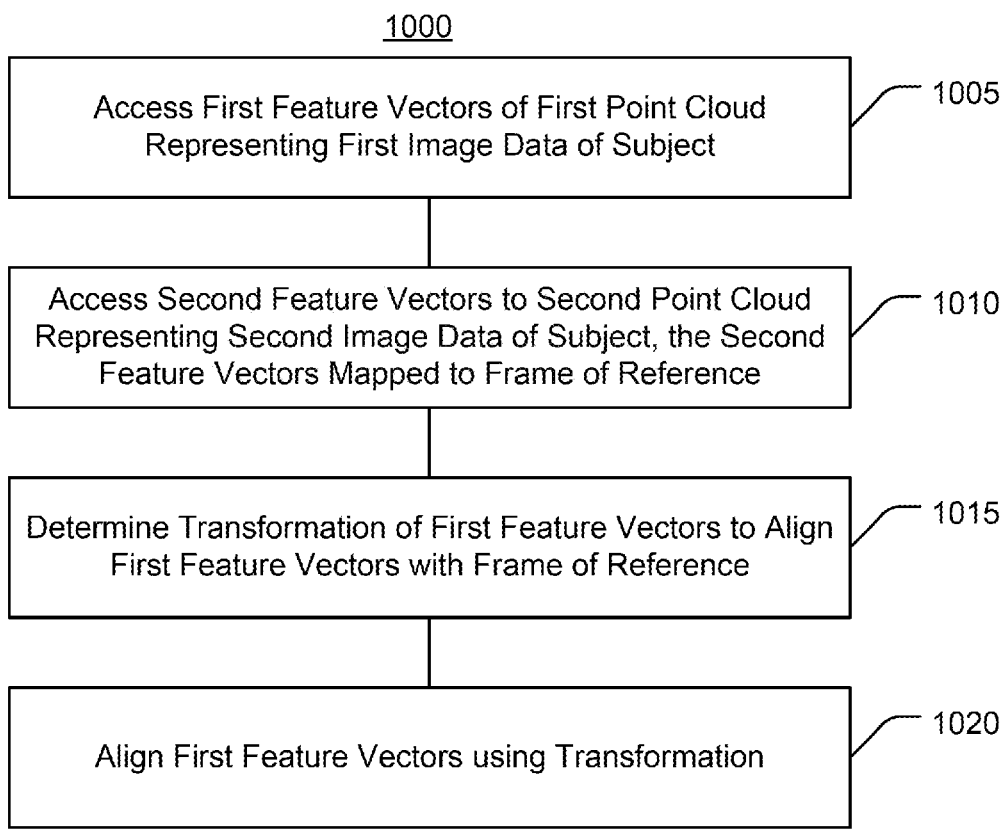
FIG. 10 is a flow diagram of a method for registering a point cloud of a medical image to a global scene point cloud according to an embodiment of the present disclosure.

FIG. 10 depicts a method 1000 for registering a point cloud of a medical image to a global scene point cloud. The method 1000 can be performed using various devices and systems described herein, such as the image processing system 100.

At 1005, a plurality of first feature vectors is accessed. The first feature vectors can correspond to a first point cloud representing first image data of a subject. For example, the first feature vectors can be generated from first point cloud data of the subject, which can be resampled prior to feature detection. The first image data can be a medical image (e.g., CT, MRI).

At 1010, a plurality of second feature vectors is accessed. The second feature vectors can correspond to a second point cloud representing second image data of the subject. For example, the second feature vectors can be generated from second point cloud data of the subject, which can be resampled prior to feature detection.

The plurality of second feature vectors can be mapped to a frame of reference. For example, the first image data can be of a global scene point cloud (which can be generated and updated over time) corresponding to the frame of reference.

At 1015, a transformation of the plurality of first feature vectors is determined. The transformation can be determined in order to align the plurality of first feature vectors with the frame of reference. In some embodiments, a correspondence is generated between one or more first feature vectors and one or more second feature vectors (e.g., based on L2 distance between feature vectors). The transformation can be determined by applying one or more alignment algorithms to the feature vectors or the correspondences between the features vectors, such as random sample consensus (RANSAC) and iterative closest point (ICP); in some embodiments, a first pass is performed using RANSAC and a second pass is performed using ICP, which can improve the accuracy of the transformation identified. The transformation can be determined using the alignment algorithm(s) as a transformation matrix that can be applied to the first point cloud data points At, 1020, the plurality of first feature vectors (or the first point cloud data points) is aligned with the second point cloud (e.g., with the frame of reference of the global scene). The alignment can be performed by applying the transformation (e.g., the transformation matrix) to the first feature vectors or the first point cloud data points associated with the first feature vectors.

IX. Systems and Methods for Real-Time Surgical Planning Visualization Using Pre-Captured Medical Images and Global Scene Images The image processing pipeline described herein can enable improved surgical planning visualization, such as to visualize 3D images together with medical images and models, along with planning trajectories for instrument navigation.

Figure 11:
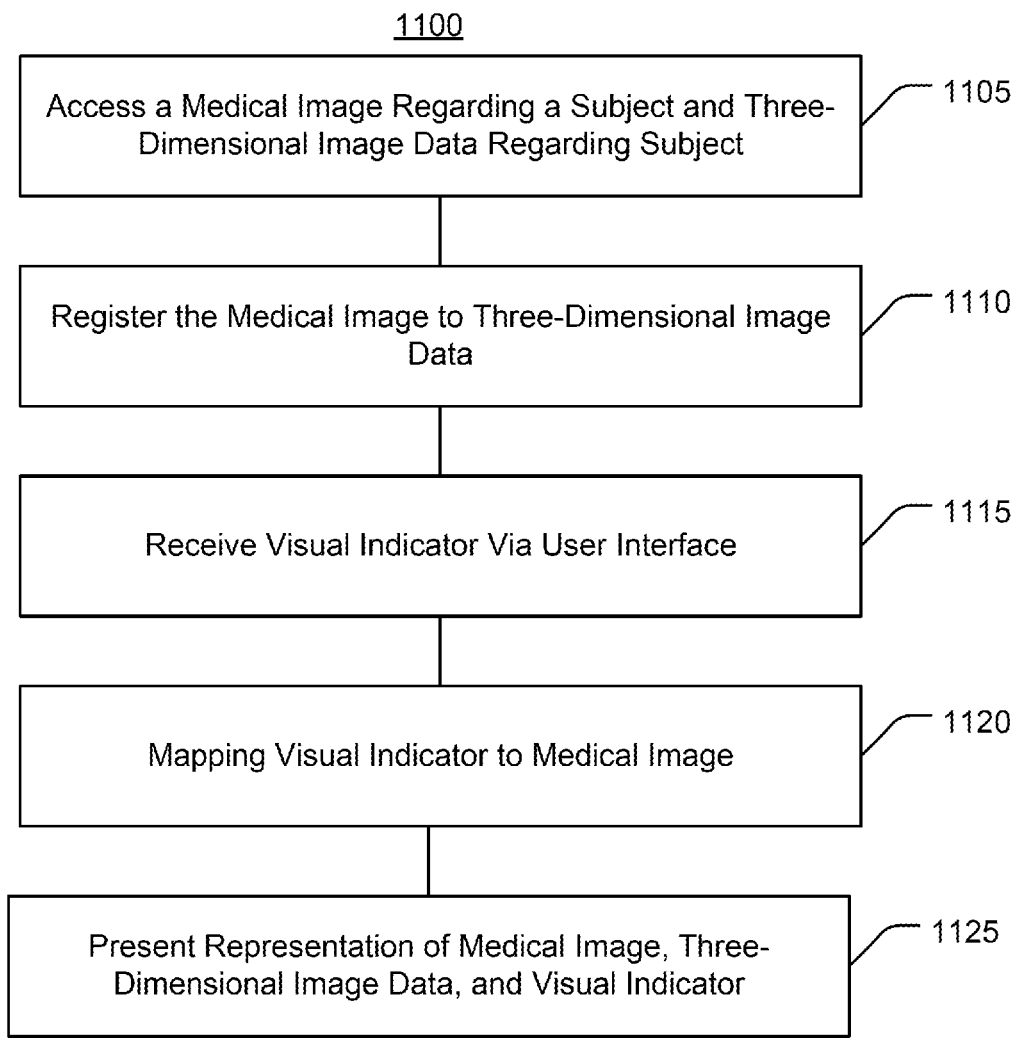
FIG. 11 is a flow diagram of a method for real-time surgical planning visualization using pre-captured medical images and global scene images according to an embodiment of the present disclosure.
Figure 12:
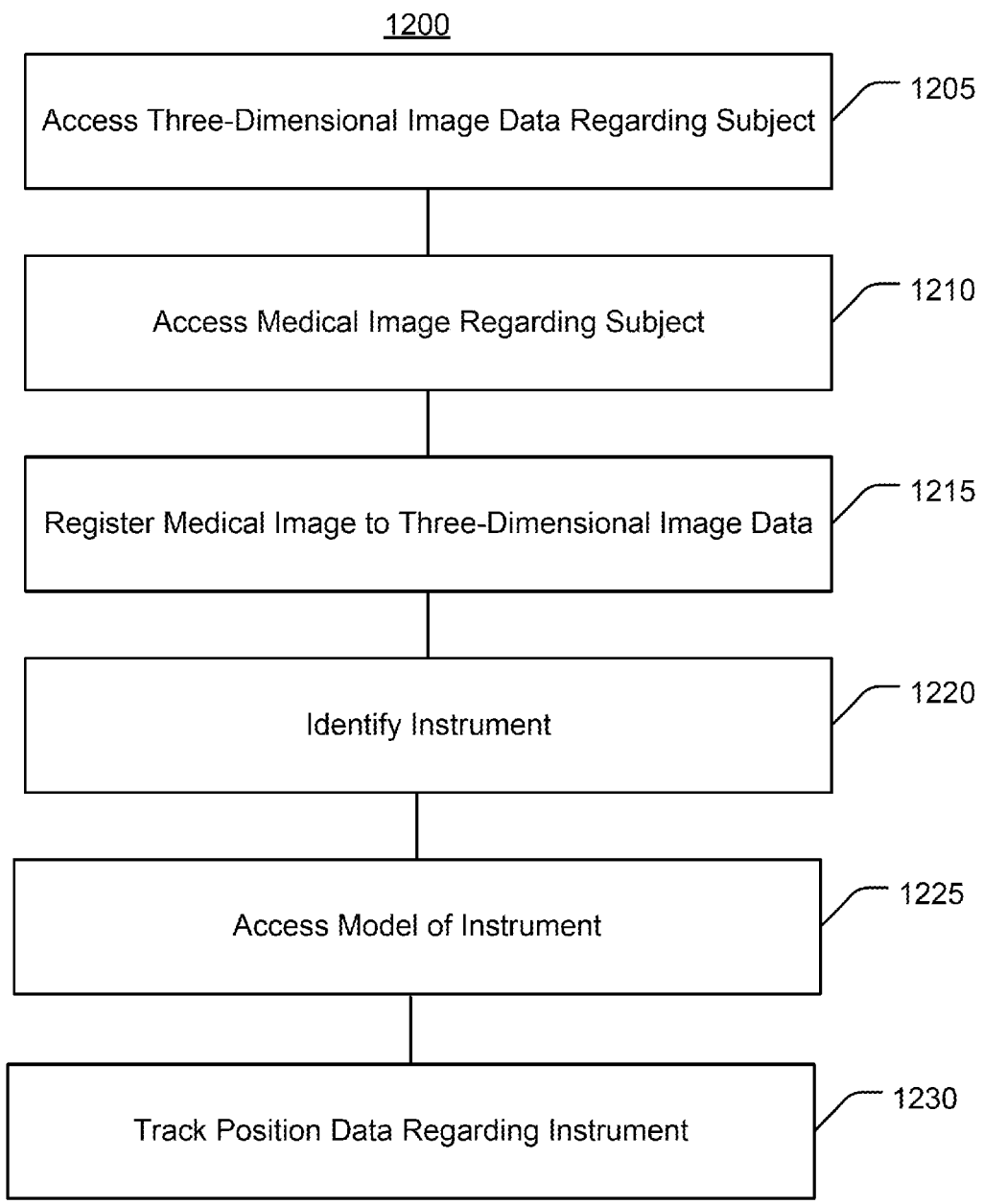
FIG. 12 is a flow diagram of a method for dynamically tracking instrument movement in a 3D image environment according to an embodiment of the present disclosure.

FIG. 11 depicts a method 1100 for real-time surgical planning visualization using pre-captured medical images and global scene images. The method 1100 can be performed using various devices and systems described herein, such as the image processing system 100.

At 1105, a medical image regarding a subject and three-dimensional image data regarding the subject is accessed. The medical image can include various medical images such as CT or MM images. The 3D image data can be received from one or more 3D cameras, such as depth cameras.

At 1110, the medical image is registered to the three-dimensional image data. The registration can be performed using various processes described herein, such as by resampling the medical image data and 3D image data, determining features from the resampled data, identifying a transformation to align the medical image data and 3D image data (e.g., to each other or to a global frame of reference), and applying the transformation to one or both of the medical image data or 3D image data.

At 1115, a visual indicator via a user interface is received. The visual indicator can indicate a trajectory or path in the environment presented using the medical image data and 3D image data. For example, the visual indicator can indicate a path through which an instrument is to be introduced into the subject.

At 1120, the visual indicator is mapped to the medical image. For example, a frame of reference in which the visual indicator is received can be identified, and a transformation of the visual indicator to the medical image can be determined to map the visual indicator to the medical image.

At 1125, a representation of the medical image, the three-dimensional image data, and the visual indicator is presented. The medical image, the three-dimensional image data, and the visual indicator can be presented using a display device. For example, the visual indicator can be presented as an overlay on the 3D image of the subject and the CT or MRI image of the subject. Presenting the medical image can include presenting display data corresponding to the visual indicator that includes at least one of a highlight of a target feature of the subject or a trajectory for an instrument.

X. Systems and Methods for Dynamically Tracking Instrument Movement in a 3D Image Environment As discussed above, IR sensors can be used to track instruments in the environment around the subject as well as while the instruments are being operated on the subject. The present solution can use the tracking data to display a representation of the tracked instruments together with 3D image data and medical image data (e.g., CT or MRI), enabling a user to effectively visualize how the instrument is interacting with the subject.

At 1205, three-dimensional image data regarding an environment about a subject can be accessed. The 3D image data can be received from one or more 3D cameras, such as depth cameras.

At 1210, a medical image regarding the subject can be accessed. The medical image can include various medical images such as CT or Mill images.

At 1215, the medical image can be registered to the three-dimensional image data. The registration can be performed using various processes described herein, such as by resampling the medical image data and 3D image data, determining features from the resampled data, identifying a transformation to align the medical image data and 3D image data (e.g., to each other or to a global frame of reference), and applying the transformation to one or both of the medical image data or 3D image data.

At 1220, an instrument can be identified from the 3D image data. The instrument can be identified by performing any of a variety of object recognition processes using the 3D image data, such as by retrieving template features of the object and comparing the template feature to features extracted from the 3D image data. The instrument can be identified based on an identifier coupled with the instrument (e.g., a visual indicator), which can reduce computational requirements for identifying the instrument by reducing a search space of the 3D image data from which the instrument is identified.

At 1225, a model of the instrument is accessed. The model can indicate shapes, contours, edges, or other features of the instrument. The model can include the template features used to identify the instrument.

At 1230, position data regarding the instrument is tracked by matching a portion of the three-dimensional image data representing the instrument to the model of the instrument. For example, responsive to matching features extracted from the image data to the model of the instrument, the position of the instrument in the 3D image data can be identified, and monitored across images (e.g., of a stream of images from a 3D camera) to track the instrument.

XI. Computing Environments for Real-Time Multiple Modality Image Alignment

Figure 13A:
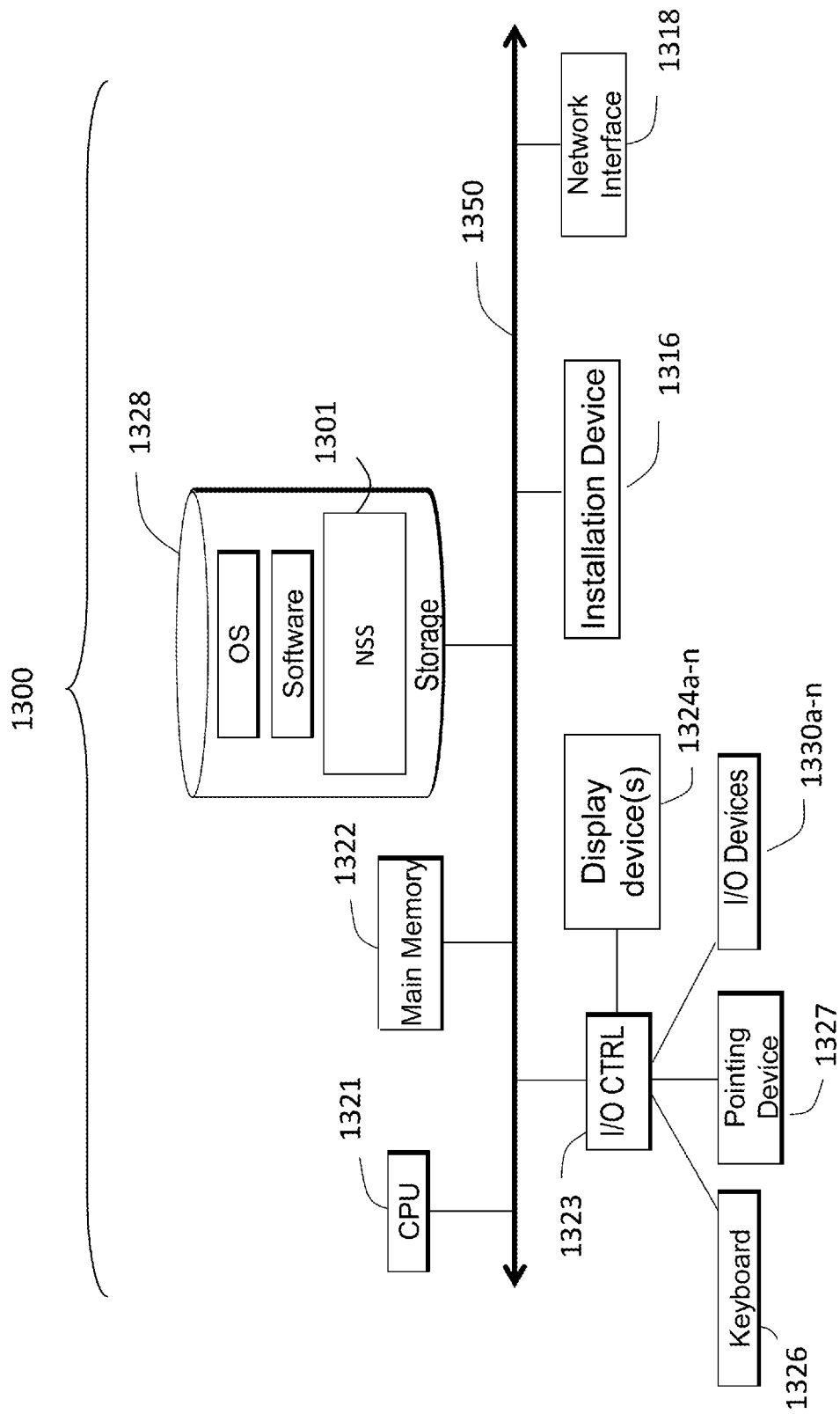
FIGS. 13A and 13B are block diagrams of a computing environment according to an embodiment of the present disclosure.
Figure 13B:
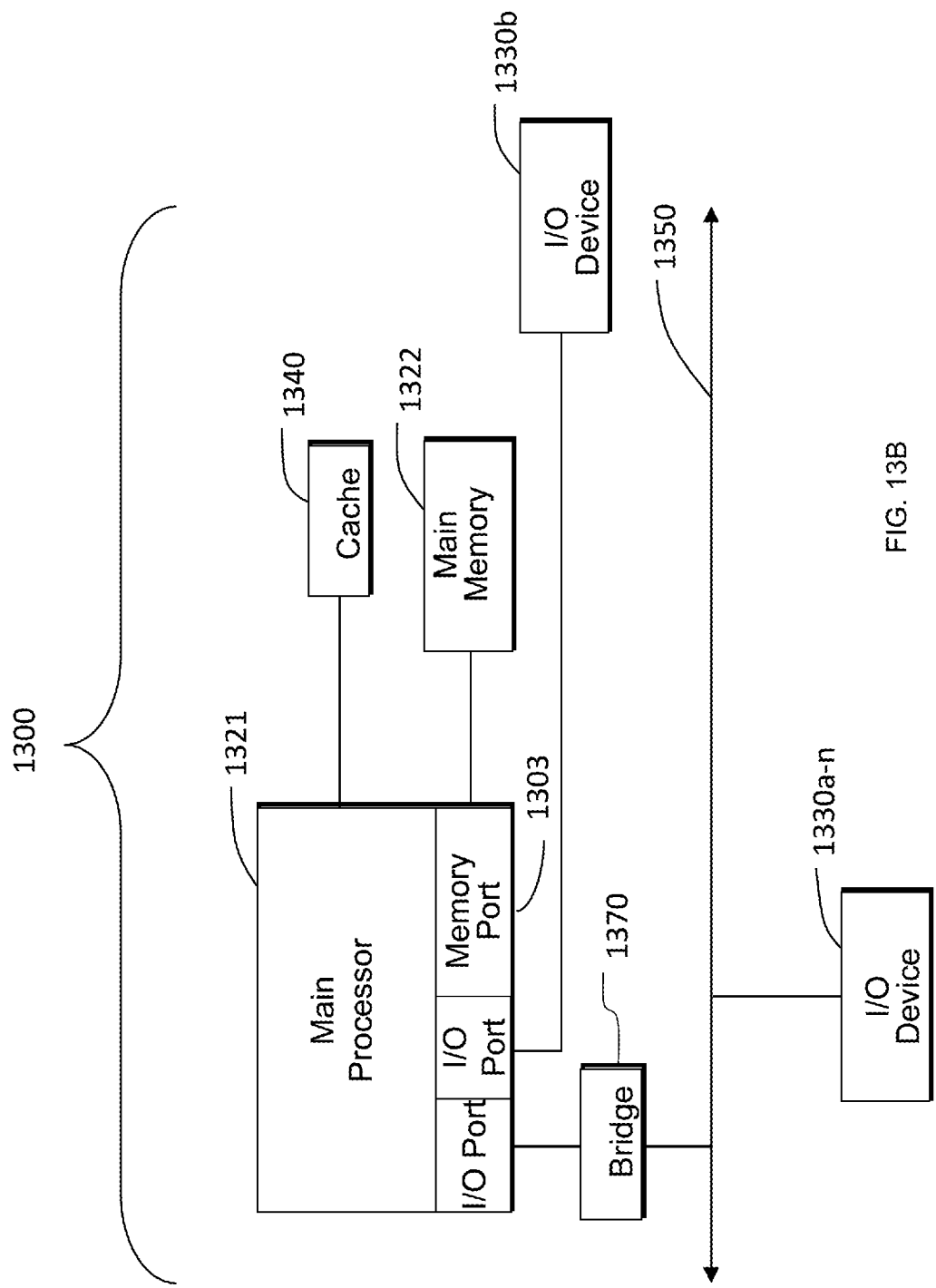
Figure 14:
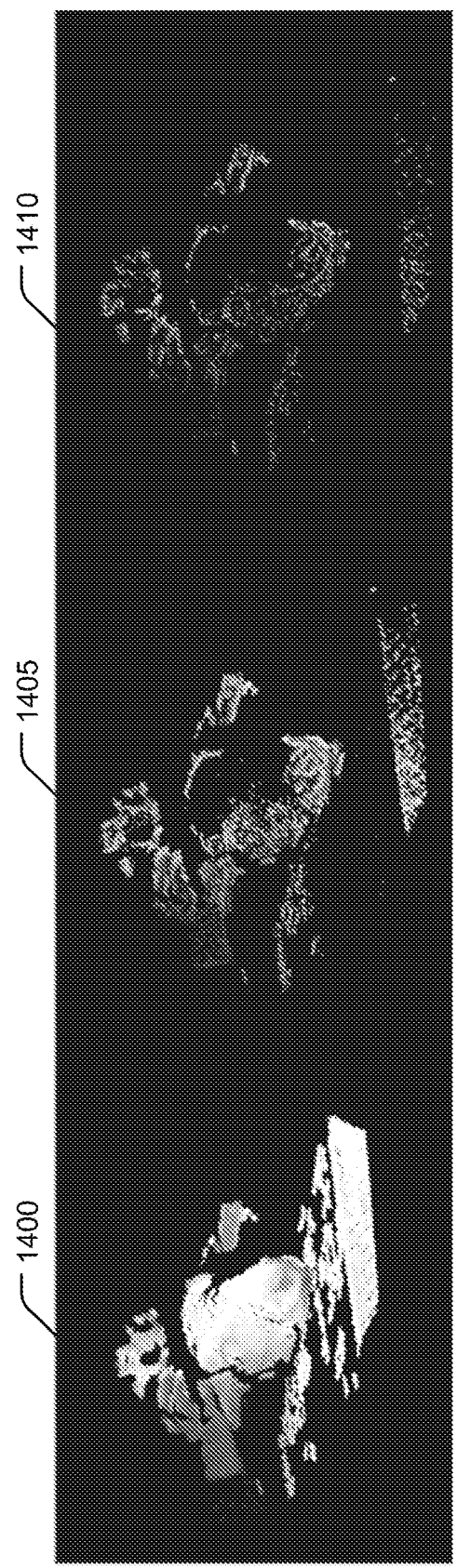
FIG. 14 depicts resampled images according to an embodiment of the present disclosure.

FIGS. 13A and 13B depict block diagrams of a computing device 1300. As shown in FIGS. 13A and 13B, each computing device 1300 includes a central processing unit 1321, and a main memory unit 1322. As shown in FIG. 13A, a computing device 1300 can include a storage device 1328, an installation device 1316, a network interface 1318, an I/O controller 1323, display devices 1324a-1324n, a keyboard 1326 and a pointing device 1327, e.g. a mouse. The storage device 1328 can include, without limitation, an operating system, software, and software of the system 200. As shown in FIG. 13B, each computing device 1300 can also include additional optional elements, e.g. a memory port 1303, a bridge 1370, one or more input/output devices 1330a-1330n (generally referred to using reference numeral 1330), and a cache memory 1340 in communication with the central processing unit 1321.

The central processing unit 1321 is any logic circuitry that responds to and processes instructions fetched from the main memory unit 1322. In many embodiments, the central processing unit 1321 is provided by a microprocessor unit, e.g.: those manufactured by Intel Corporation of Mountain View, California; those manufactured by Motorola Corporation of Schaumburg, Illinois; the ARM processor (from, e.g., ARM Holdings and manufactured by ST, TI, ATMEL, etc.) and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California; or field programmable gate arrays ("FPGAs") from Altera in San Jose, California, Intel Corporation, Xlinix in San Jose, CA, or MicroSemi in Aliso Viejo, CA, etc. The computing device 1300 can be based on any of these processors, or any other processor capable of operating as described herein. The central processing unit 1321 can utilize instruction level parallelism, thread level parallelism, different levels of cache, and multi-core processors. A multi-core processor can include two or more processing units on a single computing component. Examples of multi-core processors include the AMD PHENOM IIX2, INTEL CORE i5 and INTEL CORE i7.

Main memory unit 1322 can include one or more memory chips capable of storing data and allowing any storage location to be directly accessed by the microprocessor 1321. Main memory unit 1322 can be volatile and faster than storage 1328 memory. Main memory units 1322 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 1322 or the storage 1328 can be non-volatile; e.g., non-volatile read access memory (NVRAM), flash memory non-volatile static RAM (nvSRAM), Ferroelectric RANI (FeRAM), Magnetoresistive RANI (MRAM), Phase-change memory (PRAM), conductive-bridging RAM (CBRAM), Silicon-Oxide-Nitride-Oxide-Silicon (SONOS), Resistive RANI (RRAM), Racetrack, Nano-RANI (NRAM), or Millipede memory. The main memory 1322 can be based on any of the above described memory chips, or any other available memory chips capable of operating as described herein. In the embodiment shown in FIG. 13A, the processor 1321 communicates with main memory 1322 via a system bus 1350 (described in more detail below). FIG. 13B depicts an embodiment of a computing device 1300 in which the processor communicates directly with main memory 1322 via a memory port 1303. For example, in FIG. 13B the main memory 1322 can be DRDRAM.

FIG. 13B depicts an embodiment in which the main processor 1321 communicates directly with cache memory 1340 via a secondary bus, sometimes referred to as a backside bus. In other embodiments, the main processor 1321 communicates with cache memory 1340 using the system bus 1350. Cache memory 1340 typically has a faster response time than main memory 1322 and is typically provided by SRAM, BSRAM, or EDRAM. In the embodiment shown in FIG. 13B, the processor 1321 communicates with various I/O devices 1330 via a local system bus 1350. Various buses can be used to connect the central processing unit 1321 to any of the I/O devices 1330, including a PCI bus, a PCI-X bus, or a PCI-Express bus, or a NuBus. For embodiments in which the I/O device is a video display 1324, the processor 1321 can use an Advanced Graphics Port (AGP) to communicate with the display 1324 or the I/O controller 1323 for the display 1324. FIG. 13B depicts an embodiment of a computer 1300 in which the main processor 1321 communicates directly with I/O device 1330b or other processors 1321' via HYPERTRANSPORT, RAPIDIO, or INFINIBAND communications technology. FIG. 13B also depicts an embodiment in which local busses and direct communication are mixed: the processor 1321 communicates with I/O device 1330a using a local interconnect bus while communicating with I/O device 1330b directly. In some embodiments, the processor 1321 can communicate with other processing devices, such as other processors 1321', GPUs, and FPGAs via the various buses connected to the processing unit 1321. For example, the processor 1321 can communicate with a GPU via one or more communications buses, such as a PCI bus, a PCI-X bus, or a PCI-Express bus, or a NuBus.

A wide variety of I/O devices 1330a-1330n can be present in the computing device 1300. Input devices can include keyboards, mice, trackpads, trackballs, touchpads, touch mice, multi-touch touchpads and touch mice, microphones (analog or MEMS), multi-array microphones, drawing tablets, cameras, single-lens reflex camera (SLR), digital SLR (DSLR), CMOS sensors, CCDs, accelerometers, inertial measurement units, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, inkjet printers, laser printers, and 3D printers.

Devices 1330a-1330n can include a combination of multiple input or output devices, including, e.g., Microsoft KINECT, Nintendo Wiimote for the WII, Nintendo WII U GAMEPAD, or Apple IPHONE. Some devices 1330a-1330n allow gesture recognition inputs through combining some of the inputs and outputs. Some devices 1330a-1330n provides for facial recognition which can be utilized as an input for different purposes including authentication and other commands. Some devices 1330a-1330n provides for voice recognition and inputs, including, e.g., Microsoft KINECT, SIRI for IPHONE by Apple, Google Now or Google Voice Search.

Additional devices 1330a-1330n have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 1330a-1330n, display devices 1324a-1324n or group of devices can be augmented reality devices. The I/O devices can be controlled by an I/O controller 1321 as shown in FIG. 13A. The I/O controller 1321 can control one or more I/O devices, such as, e.g., a keyboard 126 and a pointing device 1327, e.g., a mouse or optical pen. Furthermore, an I/O device can also provide storage and/or an installation medium 116 for the computing device 1300. In still other embodiments, the computing device 1300 can provide USB connections (not shown) to receive handheld USB storage devices. In further embodiments, an I/O device 1330 can be a bridge between the system bus 1350 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 1324a-1324n can be connected to I/O controller 1321. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays can use, e.g. stereoscopy, polarization filters, active shutters, or autostereoscopy. Display devices 1324a-1324n can also be a head-mounted display (HMD). In some embodiments, display devices 1324a-1324n or the corresponding I/O controllers 1323 can be controlled through or have hardware support for OPENGL or DIRECTX API or other graphics libraries.

In some embodiments, the computing device 1300 can include or connect to multiple display devices 1324a-1324n, which each can be of the same or different type and/or form. As such, any of the I/O devices 1330a-1330n and/or the I/O controller 1323 can include any type and/or form of suitable hardware, software, or combination of hardware and software to support, enable or provide for the connection and use of multiple display devices 1324a-1324n by the computing device 1300. For example, the computing device 1300 can include any type and/or form of video adapter, video card, driver, and/or library to interface, communicate, connect or otherwise use the display devices 1324a-1324n. In one embodiment, a video adapter can include multiple connectors to interface to multiple display devices 1324a-1324n. In other embodiments, the computing device 1300 can include multiple video adapters, with each video adapter connected to one or more of the display devices 1324a-1324n. In some embodiments, any portion of the operating system of the computing device 1300 can be configured for using multiple displays 1324a-1324n. In other embodiments, one or more of the display devices 1324a-1324n can be provided by one or more other computing devices 1300a or 1300b connected to the computing device 1300, via the network 1340. In some embodiments software can be designed and constructed to use another computer's display device as a second display device 1324a for the computing device 1300. For example, in one embodiment, an Apple iPad can connect to a computing device 1300 and use the display of the device 1300 as an additional display screen that can be used as an extended desktop. One ordinarily skilled in the art will recognize and appreciate the various ways and embodiments that a computing device 1300 can be configured to have multiple display devices 1324a-1324n.

Referring again to FIG. 13A, the computing device 1300 can comprise a storage device 1328 (e.g. one or more hard disk drives or redundant arrays of independent disks) for storing an operating system or other related software, and for storing application software programs such as any program related to the software for the system 200. Examples of storage device 1328 include, e.g., hard disk drive (HDD); optical drive including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 1328 can be non-volatile, mutable, or read-only. Some storage device 1328 can be internal and connect to the computing device 1300 via a bus 1350. Some storage device 1328 can be external and connect to the computing device 1300 via a I/O device 1330 that provides an external bus. Some storage device 1328 can connect to the computing device 1300 via the network interface 1318 over a network, including, e.g., the Remote Disk for MACBOOK AIR by Apple. Some client devices 1300 can not require a non-volatile storage device 1328 and can be thin clients or zero clients 202. Some storage device 1328 can also be used as an installation device 1316, and can be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 1300 can also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Web store for CHROME OS provided by Google Inc., and Amazon Appstore for Android OS and KINDLE FIRE provided by Amazon.com, Inc.

Furthermore, the computing device 1300 can include a network interface 1318 to interface to the network 1340 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 1300 communicates with other computing devices 1300' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 1318 can comprise a built-in network adapter, network interface card, PCMCIA network card, EXPRESS-CARD network card, card bus network adapter, wireless network adapter, USB network adapter, modem or any other device suitable for interfacing the computing device 1300 to any type of network capable of communication and performing the operations described herein.

A computing device 1300 of the sort depicted in FIG. 13A can operate under the control of an operating system, which controls scheduling of tasks and access to system resources. The computing device 1300 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 7000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, can be used on zero clients or thin clients, including, e.g., CHROMEBOOKS.

The computer system 1300 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 1300 has sufficient processor power and memory capacity to perform the operations described herein. In some embodiments, the computing device 1300 can have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 1300 is a gaming system. For example, the computer system 1300 can comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, or an XBOX 360 device manufactured by the Microsoft Corporation of Redmond, Washington, or an OCULUS RIFT or OCULUS VR device manufactured BY OCULUS VR, LLC of Menlo Park, California.

In some embodiments, the computing device 1300 is a digital audio player such as the Apple IPOD, IPOD Touch, and IPOD NANO lines of devices, manufactured by Apple Computer of Cupertino, California. Some digital audio players can have other functionality, including, e.g., a gaming system or any functionality made available by an application from a digital application distribution platform. For example, the IPOD Touch can access the Apple App Store. In some embodiments, the computing device 1300 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 1300 is a tablet e.g. the IPAD line of devices by Apple; GALAXY TAB family of devices by Samsung; or KINDLE FIRE, by Amazon.com, Inc. of Seattle, Washington. In other embodiments, the computing device 1300 is an eBook reader, e.g. the KINDLE family of devices by Amazon.com, or NOOK family of devices by Barnes & Noble, Inc. of New York City, New York.

In some embodiments, the communications device 1300 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 1300 is a laptop or desktop computer equipped with a web browser and a microphone and speaker system, e.g. a telephony headset. In these embodiments, the communications devices 1300 are web-enabled and can receive and initiate phone calls. In some embodiments, a laptop or desktop computer is also equipped with a webcam or other video capture device that enables video chat and video call.

In some embodiments, the status of one or more machines 1300 in the network are monitored, generally as part of network management. In one of these embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what can be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. Although the examples provided can be useful transforming a three-dimensional point cloud to a different reference frame, the systems and methods described herein can be applied to other environments. The foregoing implementations are illustrative rather than limiting of the described systems and methods. The scope of the systems and methods described herein can thus be indicated by the appended claims, rather than the foregoing description, and changes that come within the meaning and range of equivalency of the claims are embraced therein.

What is claimed is:

1. A method comprising:
    accessing, by one or more processors, a first set of data points of a first point cloud captured by a first capture device having a first pose, and a second set of data points of a second point cloud captured by a second capture device having a second pose different from the first pose, the first set of data points and the second set of data points each representing a respective portion of an environment including a patient;
    applying, by the one or more processors, the first set of data points as input to a segmentation model, the segmentation model including one or more functions configured to generate a plurality of segments based on density data indicated by image data of the first set of data points of the first point cloud;
    generating, by the one or more processors, the plurality of segments such that the plurality of segments correspond to a three-dimensional surface of the patient;
    generating, by the one or more processors, a surface point cloud data structure representing the three-dimensional surface of the patient, the surface point cloud data structure generated using the plurality of segments;
    applying, by the one or more processors, a response function to the surface point cloud data structure and to the second set of data points to assign respective sets of response values to the first set of data points and to the second set of data points, individual response values corresponding to weight values where larger weight values indicate an associated data point has a greater association with a feature of interest;
    resampling, by the one or more processors, the surface point cloud data structure to generate a down-sampled surface point cloud data structure and the second set of data points to generate a down-sampled second set of data points, resampling including removing data points with associated response values below a threshold value;
    selecting, by the one or more processors, a reference frame based on the down-sampled surface point cloud data structure;
    determining, by the one or more processors, a transformation data structure for the down-sampled second set of data points using the reference frame selected based on the down-sampled surface point cloud data structure;
    transforming, by the one or more processors, the down-sampled second set of data points into a transformed set of data points in the reference frame using the transformation data structure and the down-sampled second set of data points; and
    registering, by the one or more processors, a CT image or MRI image of the patient to the down-sampled surface point cloud data structure and the transformed set of data points.

2. The method of claim 1, wherein accessing the first set of data points of the first point cloud comprises:
receiving, by the one or more processors, three-dimensional (3D) image data from the first capture device; and
generating, by the one or more processors, the first point cloud to have the first set of data points using the 3D image data.

3. The method of claim 1, wherein the second capture device is the same as the first capture device.

4. The method of claim 1, wherein selecting the reference frame comprises selecting a first frame of reference of the first point cloud as the frame of reference.

5. The method of claim 1, wherein selecting the reference frame comprises:
retrieving, by the one or more processors, color data assigned to one or more of the first set of data points of the first point cloud; and
determining, by the one or more processors, the reference frame based on the color data.

6. The method of claim 1, wherein determining the transformation data structure comprises generating the transformation data structure to include a change in position or a change in rotation.

7. The method of claim 6, wherein transforming the down-sampled second set of data points comprises applying, by the one or more processors, the change in position or the change in rotation to at least one data point in the down-sampled second set of data points to generate the transformed set of data points.

8. The method of claim 1, further comprising generating, by the one or more processors, display information for a combined set of data points including the first set of data points and the transformed set of data points.

9. The method of claim 1, wherein transforming the down-sampled second set of data points comprises matching, by the one or more processors, at least one first point of the down-sampled surface point cloud data structure to at least one second point of the down-sampled second set of data points.

10. The method of claim 1, wherein the feature of interest includes a contour, an edge, or anatomically relevant information.

11. A system comprising:
one or more processors configured by machine-readable instructions to:
access a first set of data points of a first point cloud captured by a first capture device having a first pose, and a second set of data points of a second point cloud captured by a second capture device having a second pose different from the first pose, the first set of data points and the second set of data points each representing a respective portion of an environment including a patient;
apply the first set of data points as input to a segmentation model, the segmentation model including one or more functions configured to generate a plurality of segments based on density data indicated by image data of the first set of data points of the first point cloud;
generate the plurality of segments such that the plurality of segments correspond to a three-dimensional surface of the patient;
generate a surface point cloud data structure representing the three-dimensional surface of the patient, the surface point cloud data structure generated using the plurality of segments;
apply a response function to the surface point cloud data structure and to the second set of data points to assign respective sets of response values to the surface point cloud data structure and to the second set of data points, individual response values corresponding to weight values where larger weight values indicate an associated data point has a greater association with a feature of interest;
resample the surface point cloud data structure to generate a down-sampled surface point cloud data structure and the second set of data points to generate a down-sampled second set of data points, resampling including removing data points with associated response values below a threshold value;
select a reference frame based on the down-sampled surface point cloud data structure ;
determine a transformation data structure for the down-sampled second set of data points using the reference frame selected based on the down-sampled surface point cloud data structure;
transform the down-sampled second set of data points into a transformed set of data points in the reference frame using the transformation data structure and the down-sampled second set of data points; and
register a CT image or MRI image of the patient to the down-sampled surface point cloud data structure first set of data points and the transformed set of data points.

12. The system of claim 11, wherein the one or more processors are further configured by machine-readable instructions to:
receive three-dimensional image data from the first capture device; and
generate the first point cloud to have the first set of data points using the 3D image data from the first capture device.

13. The system of claim 11, wherein the second capture device is the same as the first capture device.

14. The system of claim 11, wherein the one or more processors are further configured by machine-readable instructions to select a first frame of reference of the first point cloud as the frame of reference.

15. The system of claim 11, wherein the one or more processors are further configured by machine-readable instructions to:
retrieve color data assigned to one or more of the first set of data points of the first point cloud; and
determine the reference frame based on the color data.

16. The system of claim 11, wherein the one or more processors are further configured by machine-readable instructions to generate the transformation data structure to include a change in position or a change in rotation.

17. The system of claim 16, wherein the one or more processors are further configured by machine-readable instructions to apply the change in position or the change in rotation to at least one data point in the down-sampled second set of data points to generate the transformed set of data points.

18. The system of claim 11, wherein the one or more processors are further configured by machine-readable instructions to generate display information for a combined set of data points including the first set of data points and the transformed set of data points.

19. The system of claim 11, wherein the one or more processors are further configured by machine-readable instructions to match at least one first point of the down-sampled surface point cloud data structure to at least one second point of the down-sampled second set of data points.

20. The system of claim 11, wherein the feature of interest includes a contour, an edge, or anatomically relevant information.

* * * * *